(12) United States Patent
Keskin et al.

(10) Patent No.: US 12,353,261 B2
(45) Date of Patent: Jul. 8, 2025

(54) NEURAL-NETWORK-BASED POWER MANAGEMENT FOR NEURAL NETWORK LOADS

(71) Applicant: QUALCOMM Incorporated, San Diego, CA (US)

(72) Inventors: Mustafa Keskin, San Diego, CA (US); Guoqing Miao, San Diego, CA (US); Sameer Wadhwa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 56 days.

(21) Appl. No.: 18/059,954

(22) Filed: Nov. 29, 2022

(65) Prior Publication Data
US 2023/0168728 A1 Jun. 1, 2023

Related U.S. Application Data

(60) Provisional application No. 63/284,478, filed on Nov. 30, 2021.

(51) Int. Cl.
*G06F 1/00* (2006.01)
*G06F 1/26* (2006.01)
*G06N 3/063* (2023.01)

(52) U.S. Cl.
CPC .............. *G06F 1/26* (2013.01); *G06N 3/063* (2013.01)

(58) Field of Classification Search
CPC .................................. G06F 1/26; G06N 3/063
See application file for complete search history.

(56) References Cited

U.S. PATENT DOCUMENTS

| 8,487,658 | B2 | 7/2013 | Datta et al. |
| 8,633,936 | B2 | 1/2014 | Du et al. |
| 8,698,558 | B2 | 4/2014 | Mathe et al. |
| 8,838,949 | B2 | 9/2014 | Gupta et al. |
| 9,535,490 | B2 | 1/2017 | Kaushik et al. |
| 9,608,675 | B2 | 3/2017 | Dorosenco et al. |
| 10,198,015 | B1* | 2/2019 | Ham ...................... G05F 1/575 |
| 11,218,659 | B2* | 1/2022 | Xu ......................... H04N 25/76 |
| 2005/0200297 | A1* | 9/2005 | Lee ........................ B41J 2/0458 |
| | | | 315/169.1 |

(Continued)

OTHER PUBLICATIONS

International Search Report and Written Opinion—PCT/US2022/080655—ISA/EPO—May 26, 2023.

(Continued)

*Primary Examiner* — Mohammed H Rehman
(74) *Attorney, Agent, or Firm* — Patterson + Sheridan, L.L.P.

(57) ABSTRACT

Methods and apparatus for supplying power to a dynamic load, such as a neural network circuit. One example power supply circuit generally includes a voltage regulator circuit and a distribution circuit coupled to one or more outputs of the voltage regulator circuit. The distribution circuit is configured to output different amounts of current based on changes in the dynamic load. For certain aspects, the dynamic load includes a neural network circuit having a plurality of segments. In this case, the distribution circuit may be configured to output the different amounts of current based on which segment in the plurality of segments of the neural network circuit is active.

30 Claims, 16 Drawing Sheets

(56) References Cited

U.S. PATENT DOCUMENTS

| | | | | |
|---|---|---|---|---|
| 2014/0313003 A1* | 10/2014 | Liu | ................... | H01F 27/292 |
| | | | | 336/178 |
| 2017/0052552 A1 | 2/2017 | Mahmoudi et al. | | |
| 2017/0148517 A1* | 5/2017 | Harari | ................... | H10D 62/83 |
| 2019/0180179 A1* | 6/2019 | Beyene | ................ | G06Q 10/06 |
| 2019/0206321 A1* | 7/2019 | Lo | ..................... | G09G 3/3291 |
| 2019/0302820 A1* | 10/2019 | Yasusaka | ............... | G05F 1/575 |
| 2020/0275025 A1* | 8/2020 | El Kolli | ................. | G06F 1/26 |
| 2021/0067714 A1* | 3/2021 | Wang | ................... | H04N 25/46 |
| 2022/0216787 A1* | 7/2022 | Jin | ....................... | G05F 1/595 |

OTHER PUBLICATIONS

Partial International Search Report—PCT/US2022/080655—ISA/EPO—Apr. 3, 2023.

\* cited by examiner

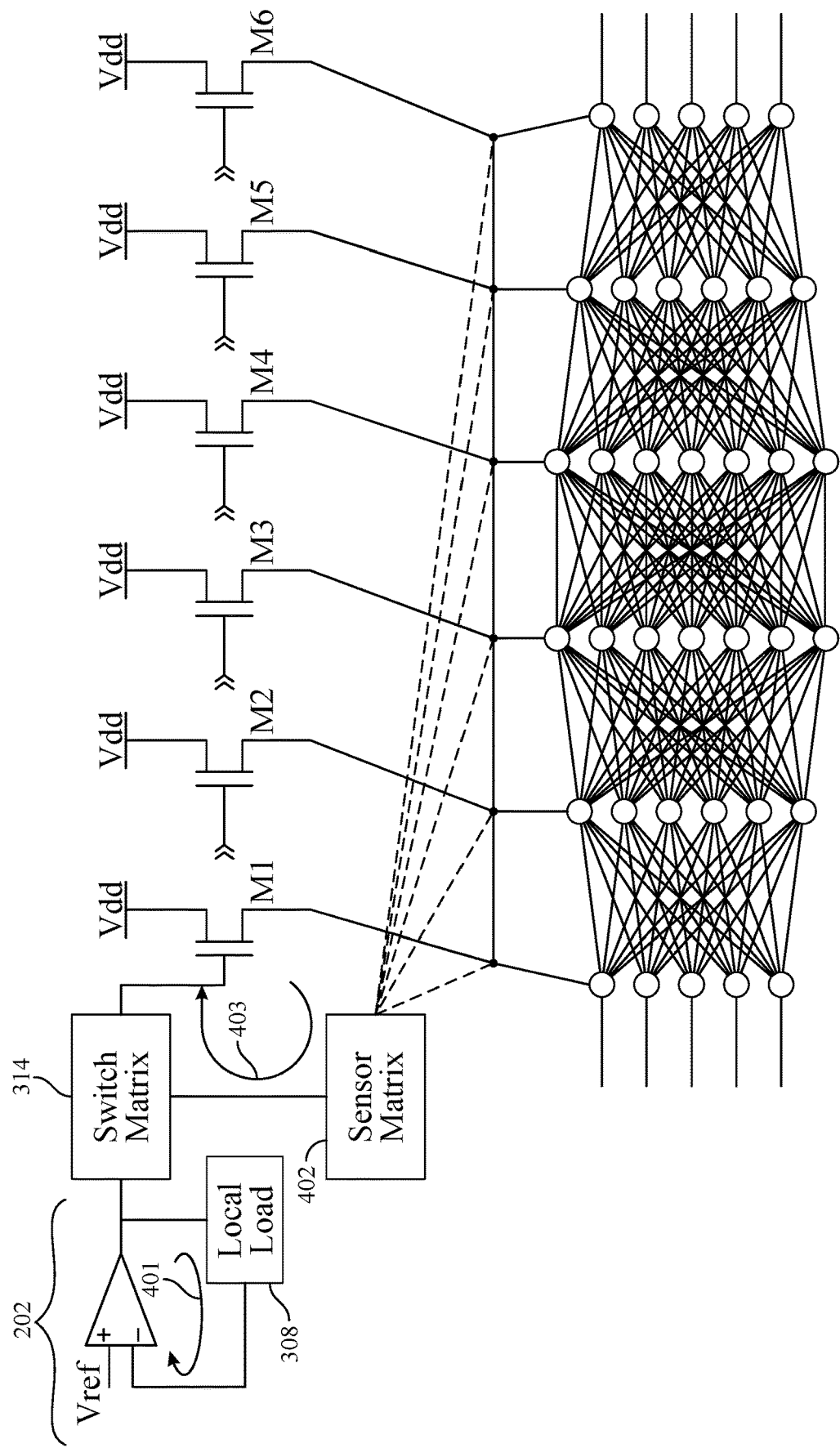

NEURAL-NETWORK-BASED POWER MANAGEMENT FOR NEURAL NETWORK LOADS

CROSS-REFERENCE TO RELATED APPLICATION(S)

This application claims benefit of and priority to U.S. Provisional Application No. 63/284,478 filed Nov. 30, 2021, which is assigned to the assignee hereof and hereby expressly incorporated by reference herein in its entirety as if fully set forth below and for all applicable purposes.

BACKGROUND

Field of the Disclosure

Aspects of the present disclosure relate to electronic circuits, and in particular, to power management techniques for dynamic loads, such as neural network circuits.

Description of Related Art

Consumer electronic devices may have complex power specifications due to the portable nature of such devices. Additionally, new technology areas such as internet-of-things (IoT) and smart electronic devices may include processors using artificial intelligence/machine learning (AI/ML) algorithms and deep neural network (DNN) hardware. Devices with these new processors may perform millions of operations per second and consume large amounts of power.

Machine learning is generally the process of producing a trained model (e.g., an artificial neural network, a tree, or other structures), which represents a generalized fit to a set of training data that is known a priori. Applying the trained model to new data produces inferences, which may be used to gain insights into the new data. In some cases, applying the model to the new data is described as "running an inference" on the new data. An artificial neural network may comprise an interconnected group of artificial neurons and may be implemented by one or more neural processing units (NPUs)). Artificial neural networks may provide innovative and useful computational techniques for certain applications in which traditional computational techniques are cumbersome, impractical, or inadequate. Because artificial neural networks can infer a function from observations, such networks are particularly useful in applications where the complexity of the task or data makes the design of the function by conventional techniques burdensome.

To supply and regulate the power to AI/ML hardware and other such high power consumption components, one or more voltage regulators may be used. A voltage regulator ideally provides a constant direct current (DC) output voltage regardless of changes in load current or input voltage. Voltage regulators may be classified as linear regulators or switching regulators. While linear regulators tend to be relatively compact, many applications may benefit from the increased efficiency of a switching regulator. A linear regulator may be implemented by a low-dropout (LDO) regulator, for example. A switching regulator (also known as a "switching converter" or "switcher") may be implemented, for example, by a switched-mode power supply (SMPS), such as a buck converter, a boost converter, a buck-boost converter, or a charge pump.

For example, a buck converter is a type of SMPS typically comprising: (1) a high-side switch coupled between a relatively higher voltage rail and a switching node, (2) a low-side switch coupled between the switching node and a relatively lower voltage rail, (3) and an inductor coupled between the switching node and a load (e.g., represented by a shunt capacitive element). The high-side and low-side switches are typically implemented with transistors, although the low-side switch may alternatively be implemented with a diode.

As another example type of SMPS, a boost converter or boost regulator produces a higher output voltage than the input voltage. During the "on" phase of a boost regulator, a shunt switch closes a loop with a voltage source and an inductor, such that the inductor stores current. During the "off" phase of the boost converter, the shunt switch is opened, and the inductor pushes the voltage at the switch side to a higher voltage in order to keep the current flowing. This activates a diode (or another switch) and passes the current to a load. The switching activity of the SMPS switch and the load fluctuations introduce dynamic currents through the inductor.

Power management integrated circuits (power management ICs or PMICs) are used for managing the power scheme of a host system and may include and/or control one or more voltage regulators (e.g., SMPS and/or LDO regulators). A PMIC may be used in battery-operated devices, such as mobile phones, tablets, laptops, wearables, etc., to control the flow and direction of electrical power in the devices. The PMIC may perform a variety of functions for the device, such as DC-to-DC conversion (e.g., using a voltage regulator as described above), battery charging, power-source selection, voltage scaling, power sequencing, etc.

SUMMARY

The systems, methods, and devices of the disclosure each have several aspects, no single one of which is solely responsible for its desirable attributes. Without limiting the scope of this disclosure as expressed by the claims that follow, some features are discussed briefly below. After considering this discussion, and particularly after reading the section entitled "Detailed Description," one will understand how the features of this disclosure provide the advantages described herein.

Certain aspects of the present disclosure are directed to a power supply circuit for supplying power to a dynamic load. The power supply circuit generally includes a voltage regulator circuit and a distribution circuit coupled to one or more outputs of the voltage regulator circuit. The distribution circuit is configured to output different amounts of current based on changes in the dynamic load. For certain aspects, the dynamic load includes a neural network circuit having a plurality of segments.

Certain aspects of the present disclosure are directed to a method of supplying power. The method generally includes operating a voltage regulator circuit; operating a distribution circuit to supply a first current to a load, the distribution circuit being coupled between one or more outputs of the voltage regulator circuit and the load; and based on a change in the load, operating the distribution circuit to supply a second current to the load, the second current being different from the first current.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer-readable storage medium comprising code for performing the aforementioned methods as well as those further described herein; and a processing system comprising means for performing the aforementioned methods as well as those further described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIGS. 4A and 4B illustrate an example distributed sensor structure added as a feedback loop to the power supply circuit, in accordance with certain aspects of the present disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 1:
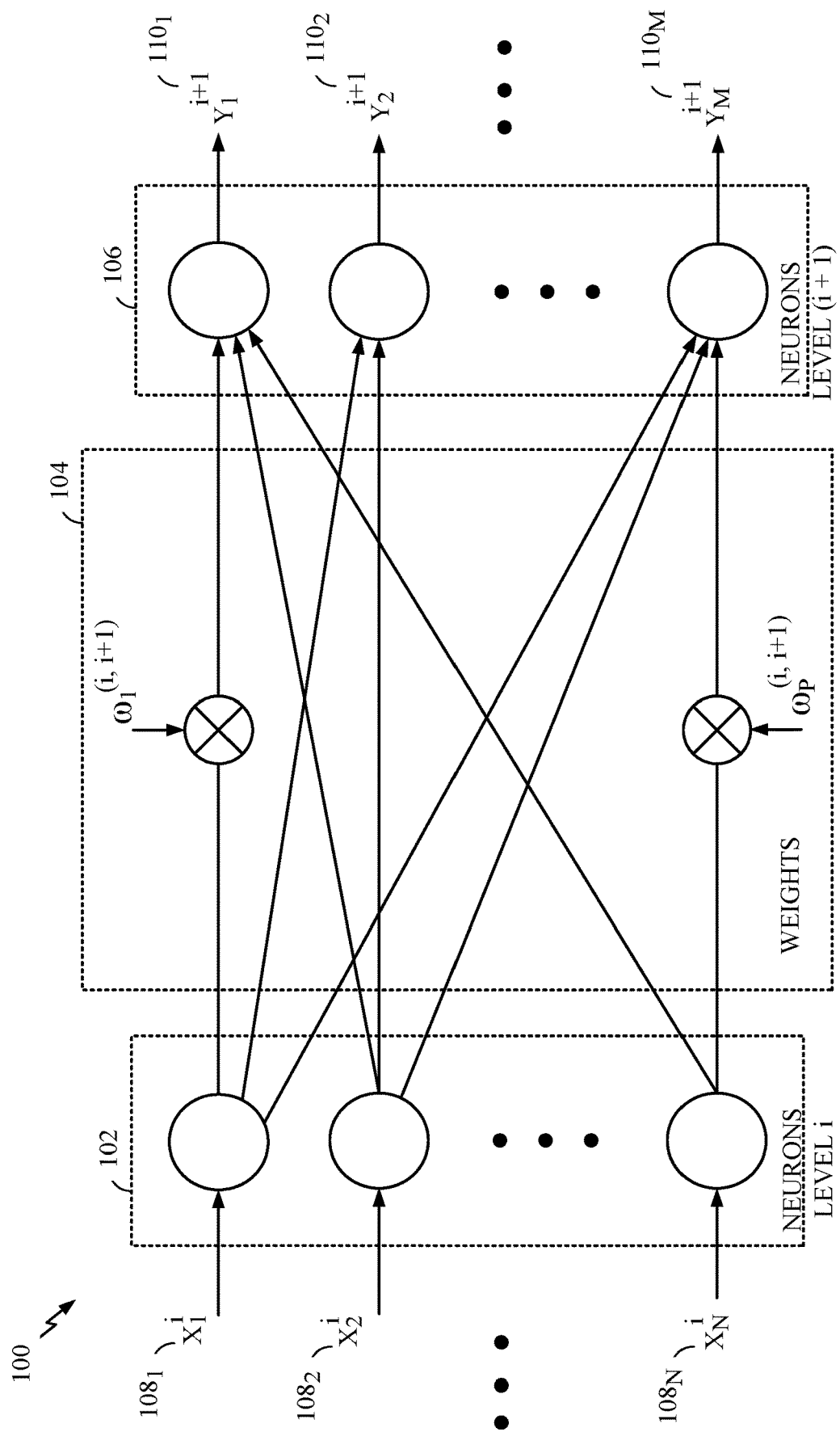
FIG. 1 illustrates an example neural network circuit, which may function as a dynamic load for certain aspects of the present disclosure.

Aspects of the present disclosure provide apparatus, methods, processing systems, and computer-readable mediums for supplying power to a dynamic load, such as a neural network circuit. One example power supply circuit generally includes a voltage regulator circuit and a distribution circuit coupled to one or more outputs of the voltage regulator circuit. The distribution circuit is configured to output different amounts of current based on changes in the dynamic load. For certain aspects, the dynamic load includes a neural network circuit having a plurality of segments. In this case, the distribution circuit may be configured to output the different amounts of current based on which segment in the plurality of segments of the neural network circuit is active.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Brief Introduction to Neural Networks, Deep Neural Networks, and Deep Learning

Neural networks are organized into layers of interconnected nodes. Generally, a node (or neuron) is where computation happens. For example, a node may combine input data with a set of weights (or coefficients) that either amplifies or dampens the input data. The amplification or dampening of the input signals may thus be considered an assignment of relative significances to various inputs with regard to a task the network is trying to learn. Generally, input-weight products are summed (or accumulated), and then the sum is passed through a node's activation function to determine whether and to what extent that signal should progress further through the network.

In a most basic implementation, a neural network may have an input layer, a hidden layer, and an output layer. "Deep" neural networks generally have more than one hidden layer.

Deep learning is a method of training deep neural networks. Generally, deep learning maps inputs to the network to outputs from the network and is thus sometimes referred to as a "universal approximator" because deep learning can learn to approximate an unknown function $f(x)=y$ between any input x and any output y. In other words, deep learning finds the right $f$ to transform x into y.

More particularly, deep learning trains each layer of nodes based on a distinct set of features, which is the output from the previous layer. Thus, with each successive layer of a deep neural network, features become more complex. Deep learning is thus powerful because deep learning can progressively extract higher-level features from input data and perform complex tasks, such as object recognition, by learning to represent inputs at successively higher levels of abstraction in each layer, thereby building up a useful feature representation of the input data.

For example, if presented with visual data, a first layer of a deep neural network may learn to recognize relatively simple features, such as edges, in the input data. In another example, if presented with auditory data, the first layer of a deep neural network may learn to recognize spectral power in specific frequencies in the input data. The second layer of the deep neural network may then learn to recognize combinations of features, such as simple shapes for visual data or combinations of sounds for auditory data, based on the output of the first layer. Higher layers may then learn to recognize complex shapes in visual data or words in auditory data. Still higher layers may learn to recognize common visual objects or spoken phrases. Thus, deep learning architectures may perform especially well when applied to problems that have a natural hierarchical structure.

Example Artificial Neural Network

Neural networks, such as deep neural networks (DNNs), may be designed with a variety of connectivity patterns between layers.

FIG. 1 illustrates an example neural network 100 with multiple levels (referred to as "layers") of artificial neurons, which may function as a dynamic load in certain aspects of the present disclosure. The neural network 100 may comprise a level 102 of neurons (labeled "Level i") connected to another level 106 of neurons (labeled "Level i+1") through a network of weights 104 (e.g., feed-forward connections). For simplicity, only two levels of neurons are illustrated in FIG. 1, although fewer or more levels of neurons may exist in a typical neural network system. It should be noted that some of the neurons may connect to other neurons of the same layer through lateral connections. Furthermore, some of the neurons may connect back to a neuron of a previous layer through feedback connections.

As illustrated in FIG. 1, each neuron in level 102 may receive an input signal, for example, from a plurality of input signals $108_1$, $108_2$, ..., $108N$ (collectively referred to herein as "input signals 108," where N is a total number of inputs into level 102). In some cases, the input signals 108 may be generated by a plurality of neurons of a previous level (not shown in FIG. 1). An input signal 108 may represent an activation input (e.g., an input current or voltage) to a neuron in level 102.

The transfer of signals from one level of neurons to another may be achieved through the network of weights 104, as illustrated in FIG. 1. The weights 104 may receive output signals from the neurons in level 102. At least some of these signals may be scaled according to adjustable weights $w_1^{(i,i+1)}$, ..., $w_P^{(i,i+1)}$ (where P is a total number of connections between the neurons of levels 102 and 106). Further, the (scaled) signals may be combined as an input signal of each neuron in level 106. Every neuron in level 106 may generate one or more output signals $110_1$, $110_2$, ..., $110_M$ (collectively referred to herein as "output signals 110," where M is a total number of outputs from level 106) based on the corresponding combined input signal. The output signals 110 may be then transferred to another level of neurons using another network of connections (not shown in FIG. 1).

The neural network 100 may be emulated by a general purpose processor, a digital signal processor (DSP), an application specific integrated circuit (ASIC), a field programmable gate array (FPGA) or other programmable logic device (PLD), discrete gate or transistor logic, discrete hardware components, a software module executed by a processor, or any combination thereof. The neural network 100 may be utilized in a large range of applications, such as image and pattern recognition, machine learning, motor control, and the like. Each neuron in the neural network 100 may be implemented as a neuron circuit.

Functionality of a neural processor that emulates the neural network 100 may depend on weights of the connections, which may control strengths of connections between neurons. The weights may be stored in a non-volatile memory in order to preserve functionality of the processor after being powered down. In an aspect, the weight memory may be implemented on a separate external chip from the main neural processor chip. The weight memory may be packaged separately from the neural processor chip as a replaceable memory card. This may provide diverse functionalities to the neural processor, where a particular functionality may be based on weights stored in a memory card currently attached to the neural processor.

Example Power Management for Dynamic Loads

A neural network may have an input layer, a hidden layer, and an output layer. Deep neural networks (DNNs) generally have more than one hidden layer. Physical neural network circuits implementing deep neural networks may experience instances of substantial transient power demand (e.g., a large current change over a short amount of time). Hardware circuits implementing deep neural networks may also experience sudden changes in load (e.g., the neural network may be expected to process a large number of multiply-and-accumulate (MAC) operations during a short period of time). These problems may be exacerbated by the complexity of deep neural network structures and limitations on computational resources. Due to the number of operations performed in DNNs and processors, it may be desirable to dynamically optimize (or at least adjust) power demand versus load throughout the neural network circuit. Furthermore, as machine learning has become increasingly utilized in various applications, it may be desirable to design system-wide techniques and structures that enable neural networks to dynamically manage power and load changes.

Aspects of the present disclosure provide techniques and apparatus for dynamically managing power and load changes in neural network circuits.

Figure 2:
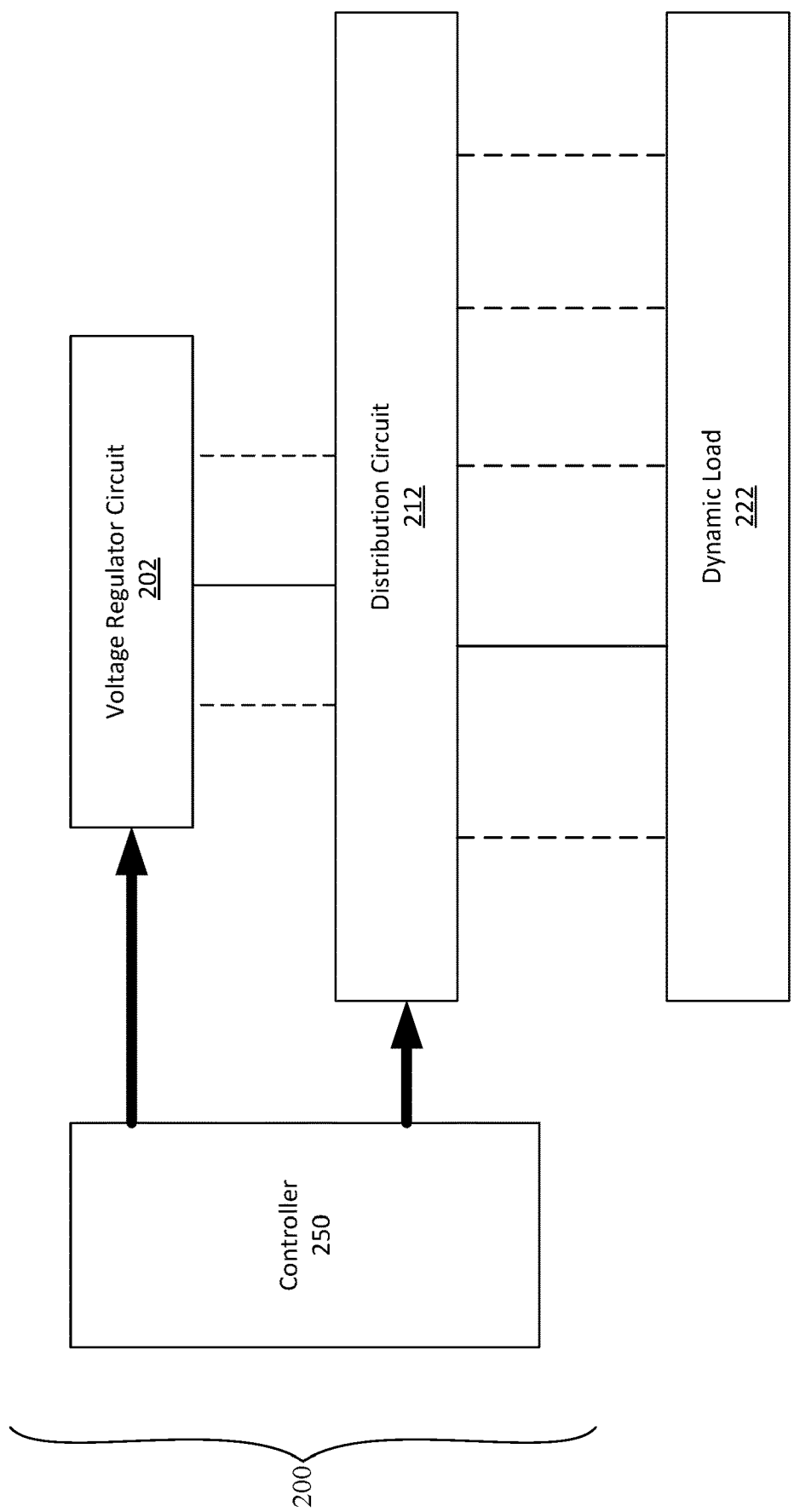
FIG. 2 is a block diagram of an example power supply circuit for a dynamic load, in accordance with certain aspects of the present disclosure.

FIG. 2 is a block diagram of an example power supply circuit 200 for a dynamic load 222, in accordance with certain aspects of the present disclosure. For certain aspects, the dynamic load 222 may include a neural network circuit (e.g., hardware implementing the neural network 100 of FIG. 1). For example, the dynamic load 222 can be at least a portion of a neural processing unit (NPU), central processing unit (CPU), graphics processing unit (GPU), digital signal processor (DSP), a subsystem of a system on a chip (SoC), and the like. The power supply circuit 200 may include a voltage regulator circuit 202 and a distribution circuit 212. The voltage regulator circuit 202 may be implemented by one or more voltage regulators (e.g., SMPS and/or LDO regulators) in one or more layers (e.g., single or stacked), may generate one or more regulated voltages, and may have one or more outputs (e.g., power supply rails) for providing the regulated voltage(s) to other components in the device (e.g., to the distribution circuit 212). The distribution circuit 212 may receive the one or more regulated voltages and may manage the amount of current sent to the dynamic load 222 via one or more outputs of the distribution circuit 212. The amount of current output to the dynamic load 222 may be controlled (e.g., gated or adjusted) based on dynamic events, the load, or changes to the load. For certain aspects, the power supply circuit 200 includes a controller 250, which may control either or both the voltage regulator circuit 202 and the distribution circuit 212. For certain aspects, the controller 250 may be implemented by a neural network circuit, which may be different from a neural network circuit in the dynamic load 222.

Figure 3A:
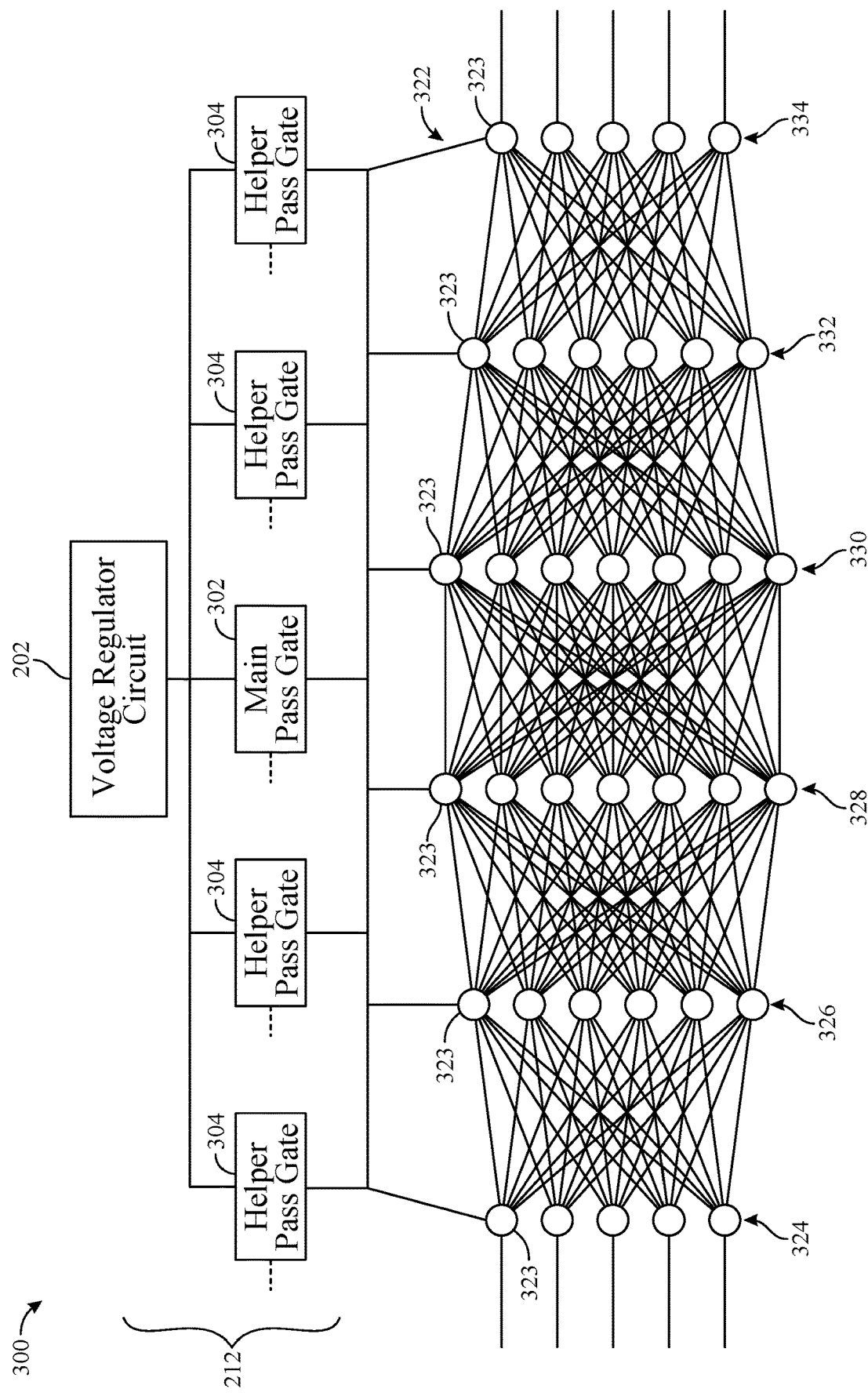
FIGS. 3A-3C illustrate an example distribution circuit implemented using pass gates and example current load distributions among the pass gates, in accordance with certain aspects of the present disclosure.

FIG. 3A is a block diagram of an example power supply circuit 300 for supplying power to a dynamic load, in accordance with certain aspects of the present disclosure. As described above, the voltage regulator circuit 202 may be implemented by one or more voltage regulators, such as by an SMPS alone, by an LDO alone, or by an SMPS and an LDO. The distribution circuit 212 may be implemented using distributed pass gates (also referred to as "transmission gates" or "analog switches"), which may include at any one time a pass gate designated as a main pass gate 302 and one or more other pass gates designated as auxiliary pass gates 304 (also referred to as "helper pass gates"). The distributed pass gate structure operates to control the current routed and available to the dynamic load depending on events or information related to power demands of the dynamic load (e.g., to one or more segments of the neural network circuit 322).

For example, the dynamic load may be a neural network circuit 322 (as shown). The neural network circuit 322 may be implemented by at least a portion of a neural processing unit (NPU), graphics processing unit (GPU), digital signal processor (DSP), or any other of various suitable hardware circuits for realizing a neural network. In FIG. 3A, the neural network circuit 322 is depicted as a neural network having multiple layers 324, 326, 328, 330, 332, and 334, but it is to be understood that the neural network circuit 322 is physical hardware (e.g., processing elements, multiply-and-accumulate (MAC) modules, logic circuits, etc.) for implementing such a neural network. It is also to be understood that each of these illustrated layers may represent a different hardware segment of the neural network circuit 322, whether these segments correspond to the neural network layers or are uncorrelated to these layers. In other words, the neural network circuit 322 need not be segmented according to neural network layers. Although six layers (segments) are shown in this example, the neural network may have more or fewer than six layers (segments).

For cases where one or more segments of the neural network circuit 322 may be activated and other segments may be inactivated at any one time, the pass gates may be aligned with the segments of the neural network circuit 322 (e.g., layers of the neural network, as shown), based on the number of segments, the segment type and/or structure, and/or the segment sizes (e.g., how many neurons 323 per layer, or how many processing elements or other components per segment). For instance, smaller pass gates may be located by, and assigned to, segments with fewer components (e.g., layers with fewer neurons 323), whereas larger pass gates (capable of greater current delivery) may be located by, and assigned to, segments with more components (e.g., layers with more neurons). As a result, power delivery may be optimized (or at least improved), and power may be conserved, which may serve to extend battery time, reduce thermal problems, and preserve longevity of electronic components in the device (e.g., the battery). In certain aspects, scaling of the size and power delivery capabilities of each pass gate is closely related to the power demands of the neural network segment the pass gate is supporting.

As a default setting, each pass gate may be configured to turn "ON" when the pass gate's associated neural network segment is active, but may otherwise be turned "OFF." At any given time, any one of the pass gates may be designated as the main pass gate 302, and the other pass gates may be considered as helper pass gates 304. The main pass gate may be determined by the current demands of the dynamic load (e.g., of the segments of the neural network circuit 322 associated with the pass gates). For example, if current is driven to a particular segment in the neural network circuit 322, then the main pass gate 302 will be the pass gate associated with that segment. Association between a pass gate and a segment of the neural network circuit 322 may, for example, be based on physical proximity between the pass gate and the segment.

Figure 3B:
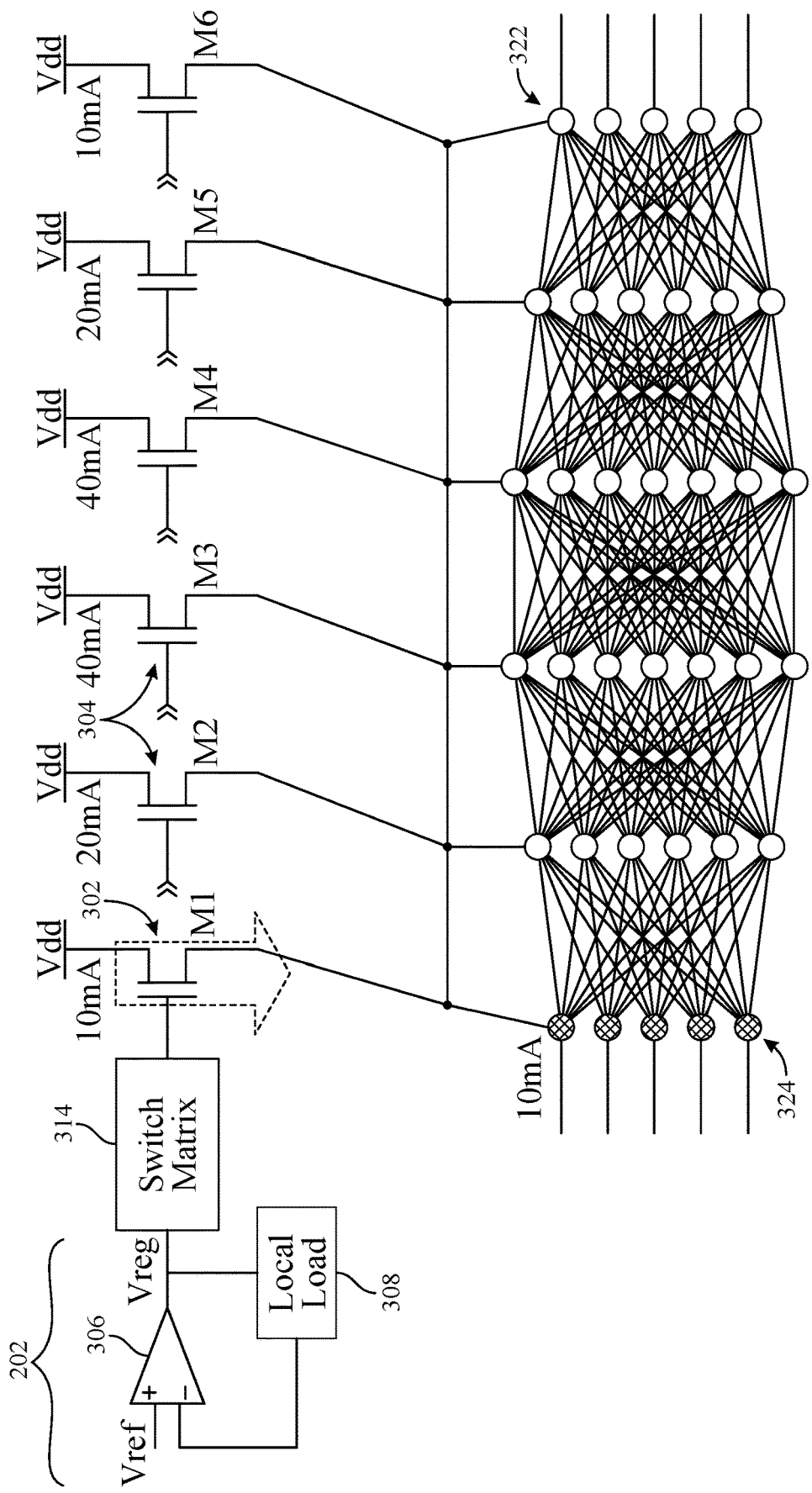

For example, as illustrated in FIG. 3B, the distribution circuit 212 of FIG. 2 includes a switch matrix 314, and the pass gates are implemented by transistors M1-M6, one transistor for each of the six segments of the neural network circuit 322 (e.g., six layers of the neural network). For certain aspects, the switch matrix 314 may provide the control inputs to the transistors (e.g., the individual gate signals for transistors M1-M6), while in other aspects, the switch matrix 314 may include the pass gate transistors (i.e., the switch matrix is implemented by the distributed pass gate transistors). The pass gate transistors may be sized differently to provide different predefined currents. For example, transistors M1 and M6 may provide 10 mA, transistors M2 and M5 may provide 20 mA, and transistors M3 and M4 may provide 40 mA, as shown. Larger currents may be provided to segments with higher numbers of components (e.g., layers with higher numbers of neurons 323). For example, when one segment (e.g., represented by layer 324) is active and the other segments are inactive, transistor M1 may be controlled to deliver 10 mA to the active segment and may be designated as the main pass gate 302, whereas the other transistors M2-M6 may be turned off and may be considered as the auxiliary pass gates 304.

FIG. 3B also illustrates an example feedback circuit for the voltage regulator circuit 202. The feedback circuit includes an amplifier 306 and a local load circuit 308 in a feedback loop for the amplifier. The local load circuit 308 may be a replica load circuit, being a simplified version of the dynamic load. For example, if the dynamic load is the neural network circuit 322, then the local load circuit 308 may replicate only a portion of the neural network circuit or may be implemented as a simpler circuit than the neural network circuit to simulate the loading effects of the neural network circuit. The local load circuit 308 may have been fabricated using the same process and may experience the same voltage and temperature (PVT) as the dynamic load. In this manner, the voltage regulator circuit 202 may generate an output voltage Vreg that compensates, or at least adjusts, for losses due to the dynamic load. The voltage Vreg from the output of the voltage regulator circuit 202 is supplied to the switch matrix 314.

In some cases, such as the one shown in FIG. 3B, the main pass gate 302 (e.g., transistor M1) may be able to deliver sufficient current to the load. However, in other cases, a load may call for more current than the main pass gate 302 can deliver. In such a case, the power supply circuit 300 may enable one or more helper pass gates (e.g., auxiliary pass gates 304) to supply more current to meet the excess load. The power supply circuit 300 may immediately enable helper pass gates if called for.

Figure 3C:
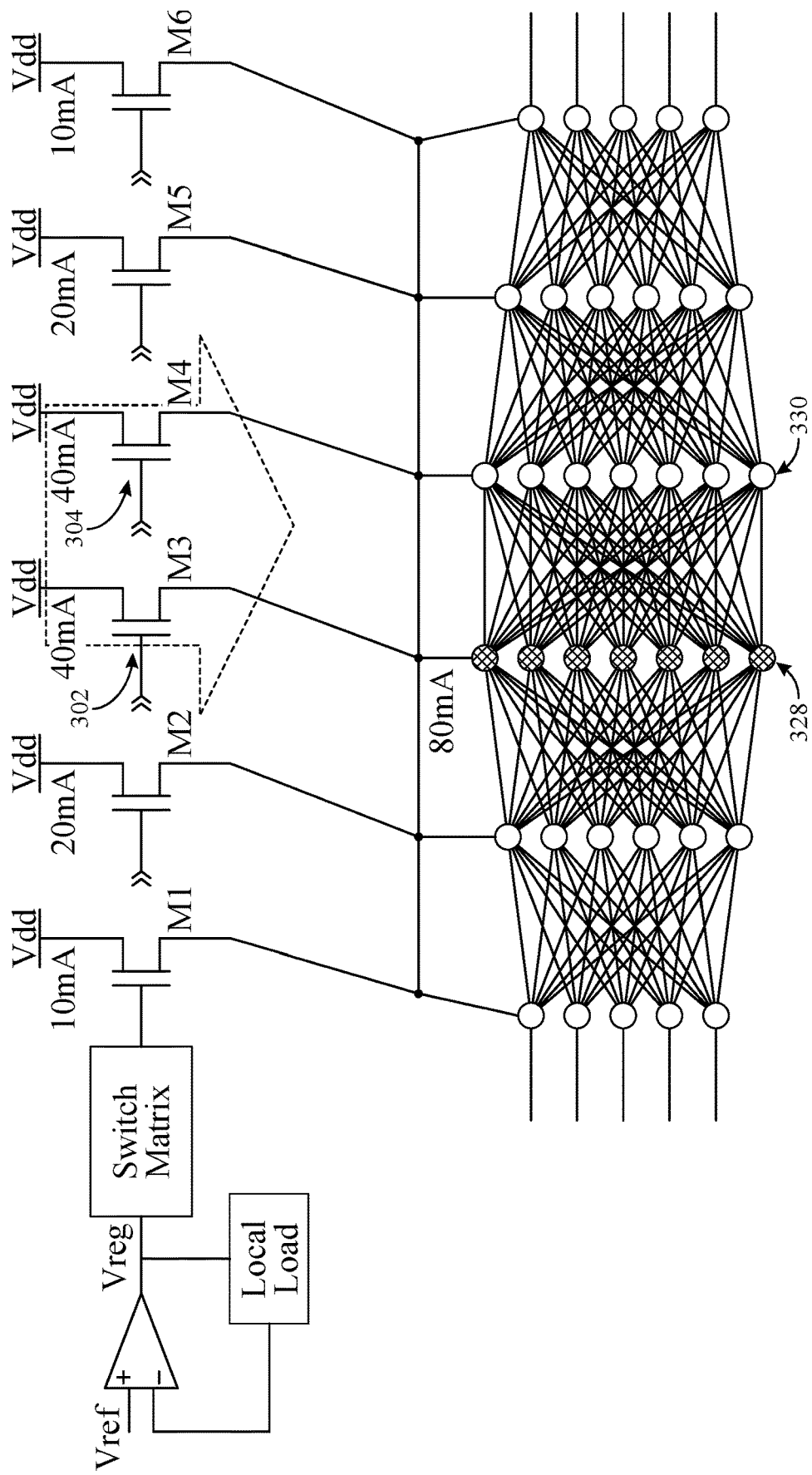

For example, in FIG. 3C, a first segment (e.g., represented by layer 328) is active, but has a demand greater than the 40 mA that transistor M3 (the designated main pass gate 302 for the first segment) can supply. Therefore, transistor M4 may be turned on as an auxiliary pass gate 304 to supply an additional 40 mA, such that 80 mA can be supplied to the first segment, even though a second segment (e.g., the segment most closely associated with transistor M4, and represented by layer 330) is inactivated. In certain aspects, other auxiliary pass gates 304 may remain disabled for efficiency, since pass gate transistors M3 and M4 are capable of delivering the current load to the active segment.

The helper pass gates may be determined based on the physical location of the gates in relation to the main pass gate and the current delivery capabilities. For example, if the helper pass gate that is physically closest to the main pass gate is capable of delivering the excess current load from the main pass gate, then there is no need to enable additional helper pass gates that are physically further from the main pass gate, even if those helper pass gates are capable of delivering a larger load than the nearest helper pass gate. Said another way, physical proximity of the helper pass gates to the main pass gate may establish a priority of the helper pass gates.

In an alternative example, if the pass gate that is physically closest to the main pass gate is not capable of delivering the entire excess load from the main pass gate, then the remaining excess load may be redirected to the next-nearest helper pass gate(s) until the entire load is distributed.

The distributed pass gates allow the power supply circuit 300 to address efficiency loss dynamically. The dynamic response may be particularly useful when load changes per neural network segment are expected (e.g., known) because the load can be distributed dynamically according to the known load changes with activation/inactivation of the segments.

Power management may be further improved by integrating a relatively slow loop and a nested fast loop in the voltage regulator circuit 202 and the distribution circuit 212, respectively. As illustrated in FIG. 4A, a distributed sensor structure may be added to the power supply circuit 300 as a feedback loop. The distributed sensor structure may be implemented by a sensor matrix 402 designed to help the power supply circuit 300 dynamically control the distribution circuit 212 (e.g., the distributed pass gate matrix). The sensor matrix 402 may include multiple sensors (e.g., voltage and/or current sensors), which may collect information regarding various parameters based on load activity at each of the pass gates. This information may be used (e.g., by the sensor matrix 402 and/or by the controller 250) to determine which pass gates to enable for future expected loads.

The voltage regulator circuit 202 may include a feedback loop 401, which may be considered a "slow" feedback loop since changes may propagate through several components (e.g., the processing and/or other circuit elements in the local load circuit 308) prior to updating the regulated output voltage Vreg. The sensor matrix 402 may be part of a "fast" feedback loop 403 and may, in some instances, be directly coupled to the switch matrix 314. The feedback loop 403 may be considered a fast feedback loop since data from the sensor matrix 402 is quickly gathered by the sensors and provided directly to the switch matrix 314. This allows the switch matrix 314 to quickly respond to the information from the sensor matrix 402. However, direct coupling may lead to the switch matrix 314 relying on faulty information (e.g., information based on a glitch or overshot current), which may be problematic.

Accordingly, certain aspects of the present disclosure provide for differentiating between different types of sensor information. For example, some particular information may be sent from the sensor matrix 402 directly to the switch matrix 314. This particular information may be used to control helper pass gates with relatively small currents, such as helper pass gates designated for least significant bits (LSBs). The remaining portion of the information may be sent through another feedback loop (e.g., involving the controller 250) which should not experience the same problem since this other feedback loop may most likely be capable of differentiating and ignoring faulty information resulting from a glitch or similar event.

Figure 4B:
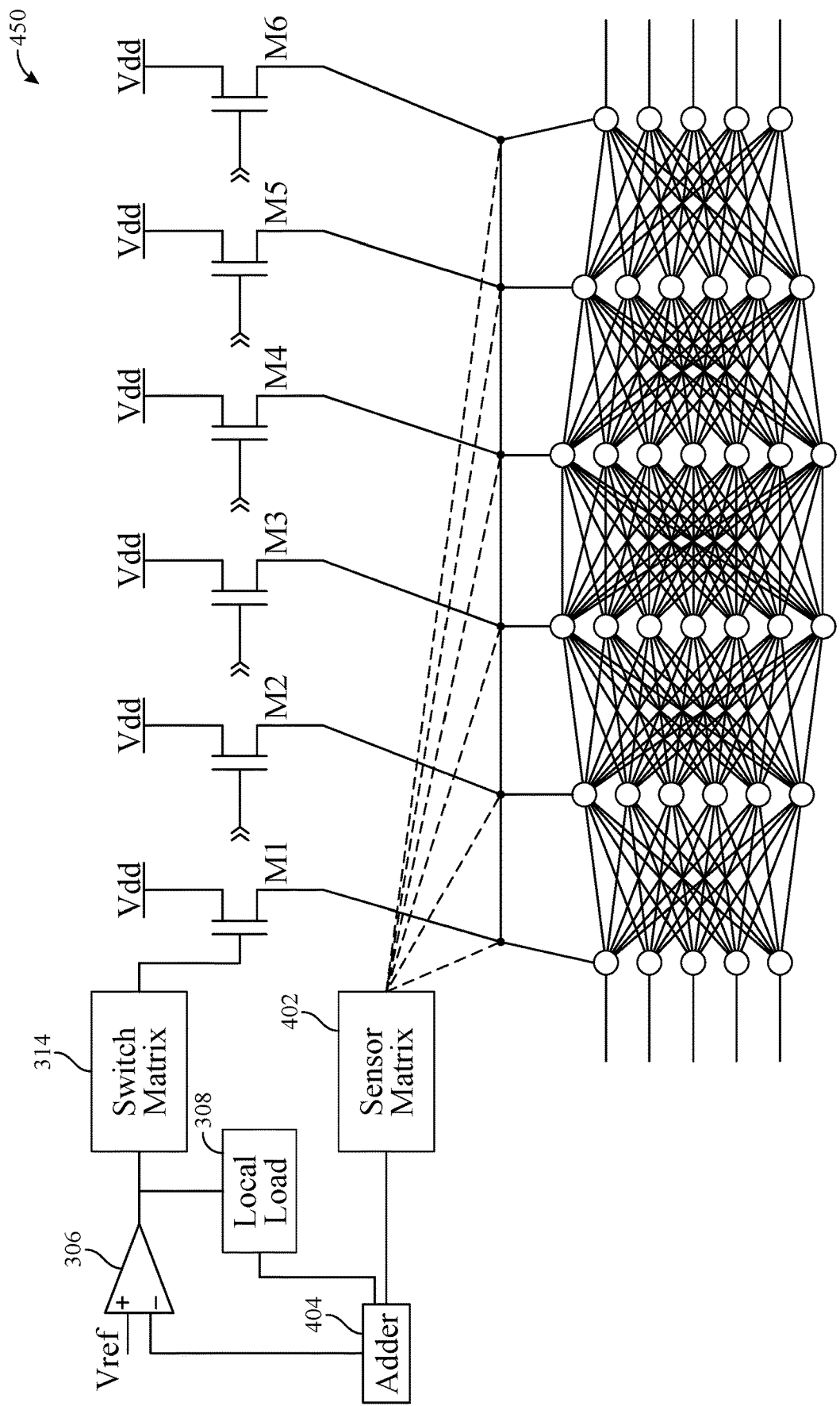

FIG. 4B illustrates an example power supply circuit 450 in which the distributed sensor structure is added as feedback, where the two feedback loops have been merged in a mixed-speed implementation, in accordance with certain aspects of the present disclosure. The power supply circuit 450 of FIG. 4B includes a combiner 404 (e.g., an adder), which may receive input from the local load circuit 308 and from the sensor matrix 402 and may combine (e.g., add) this information to provide feedback for the amplifier 306.

Figure 5A:
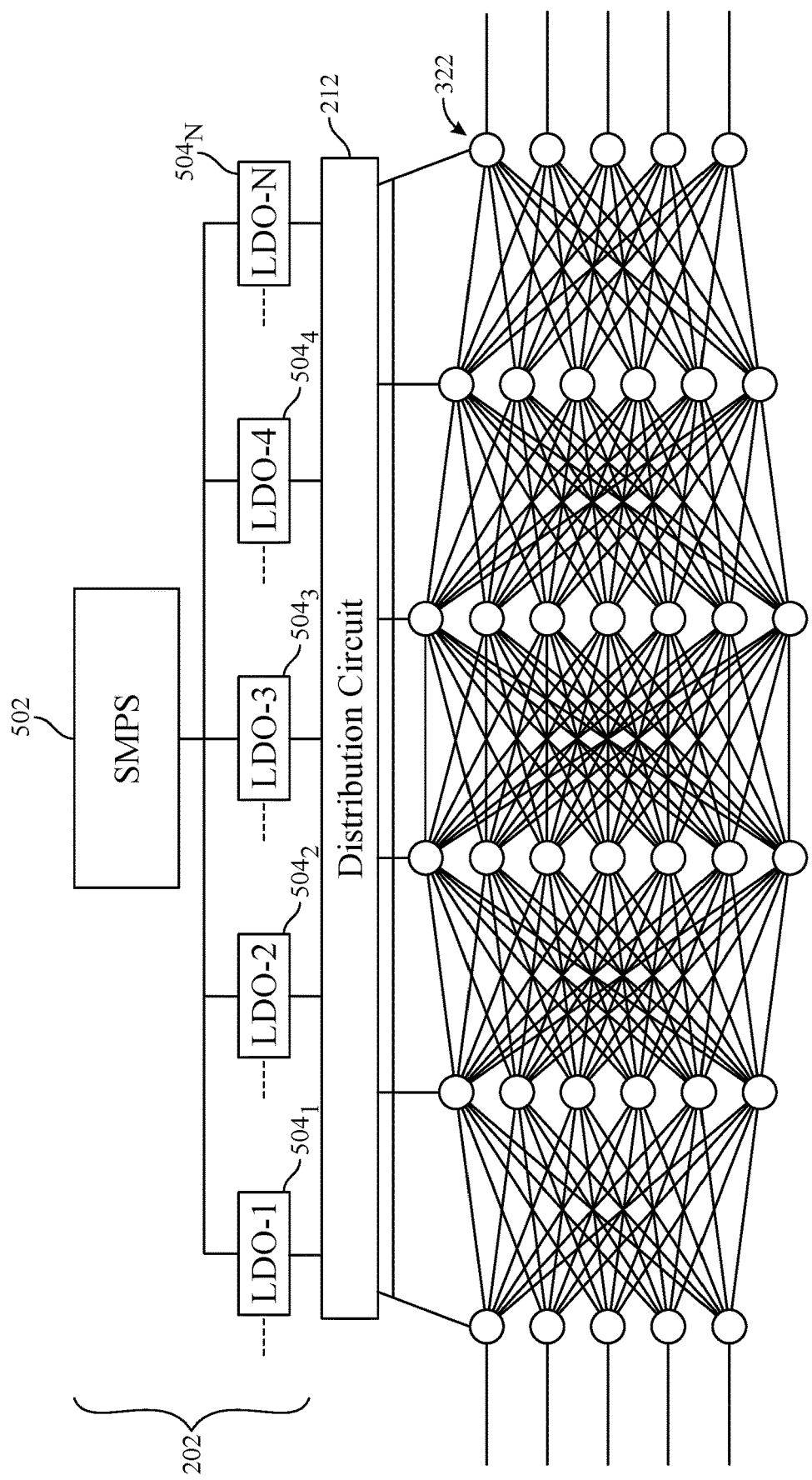
FIGS. 5A-5C illustrate an example stacked power supply scheme implemented in the power supply circuit, in accordance with certain aspects of the present disclosure.

FIG. 5A illustrates an example flexible stacked power supply scheme, in accordance with certain aspects of the present disclosure. The stacked power supply scheme may be implemented in the power supply circuit 300 of FIG. 3A, for example. In the stacked power supply scheme, the voltage regulator circuit 202 may include a primary voltage regulator circuit 502 and one or more secondary voltage regulator circuits $504_1$, $504_2$, ..., $504_N$ (collectively referred to herein as "secondary voltage regulator circuits 504"). The primary voltage regulator circuit 502 may be implemented by a switched-mode power supply (SMPS), as shown, or by a different type of regulator. The secondary voltage regulator circuits 504 may be implemented by any of various suitable regulators, such as by LDO regulators (as shown), SMPS regulators, or a combination of LDO and SMPS regulators. The secondary voltage regulator circuits 504 may provide two or more different output voltages for flexible power management, where a particular secondary voltage regulator circuit 504 may be selected based on changes in the dynamic load (e.g., based on activation of one or more segments of the neural network circuit 322). As shown, in some examples, the number of secondary voltage regulator circuits 504 may be the same as the number of segments in the neural network circuit 322.

In the case of LDO regulators, at least some of the secondary voltage regulator circuits 504 can be different types. For example, one of the LDO regulators may be implemented as a PMOS regulator, while another LDO regulator may be an NMOS regulator. Similarly, some LDO regulators may be series regulators, while other LDO regulators may be parallel regulators. Additionally, some LDO regulators may operate at a different voltage or power level than other LDO regulators (e.g., some may be low-power regulators, while others are high-power and/or medium-power regulators).

Figure 5B:
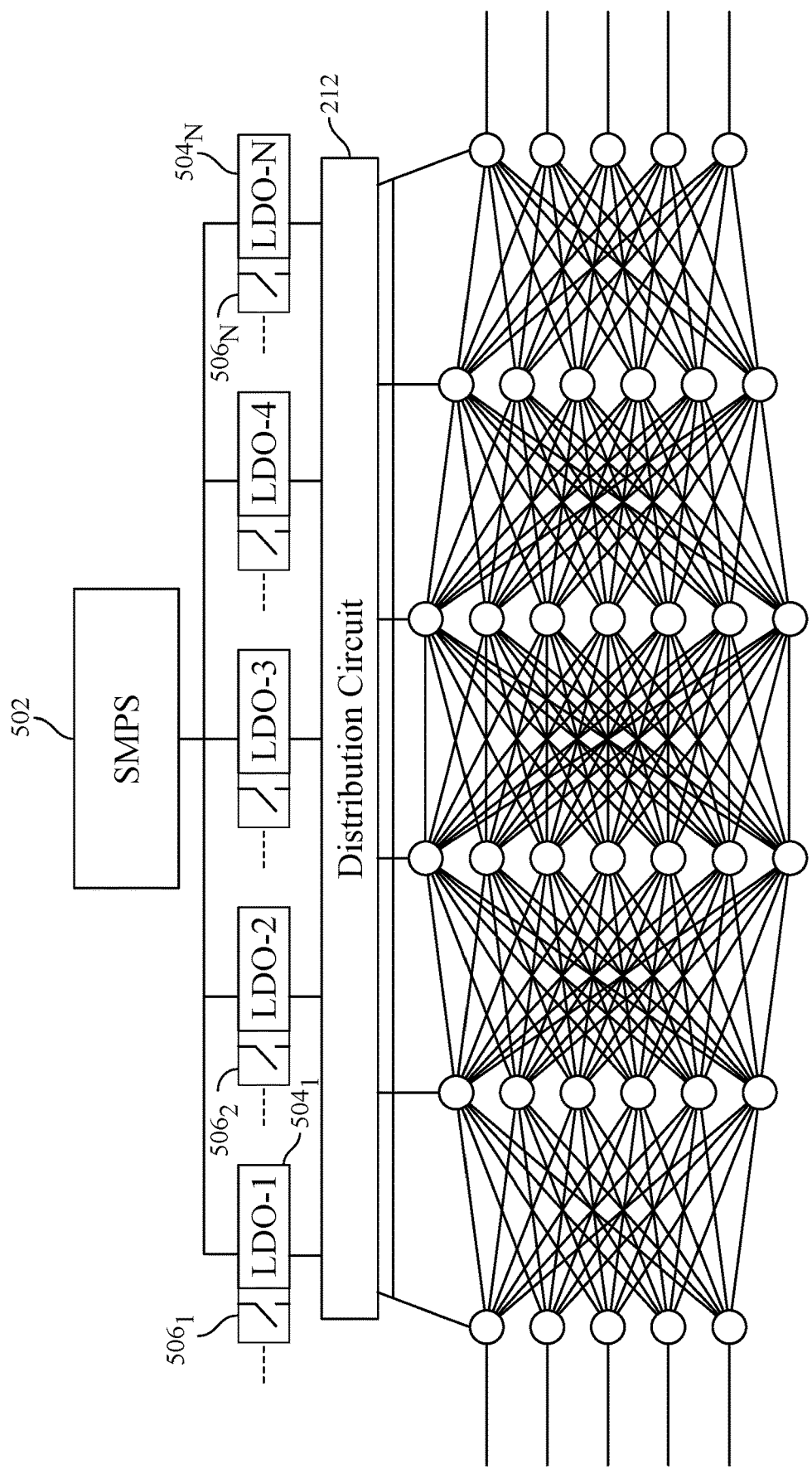

The secondary voltage regulator circuits 504 may include switches to act as a bypass for surge control. For example, if the dynamic load demands a large current for a preset, relatively short amount of time, then a temporary bypass operation may be implemented using an open loop configuration to help mitigate the sudden rush of current. FIG. 5B illustrates example bypass switches 5061, 5062, . . . , 506N (collectively referred to herein as "secondary bypass switches 506") added to the secondary voltage regulator circuits 504, such that the voltage regulator circuit 202 can bypass (e.g., short circuit) one or more of the secondary voltage regulator circuits 504 and provide current directly from the primary voltage regulator circuit 502.

Figure 5C:
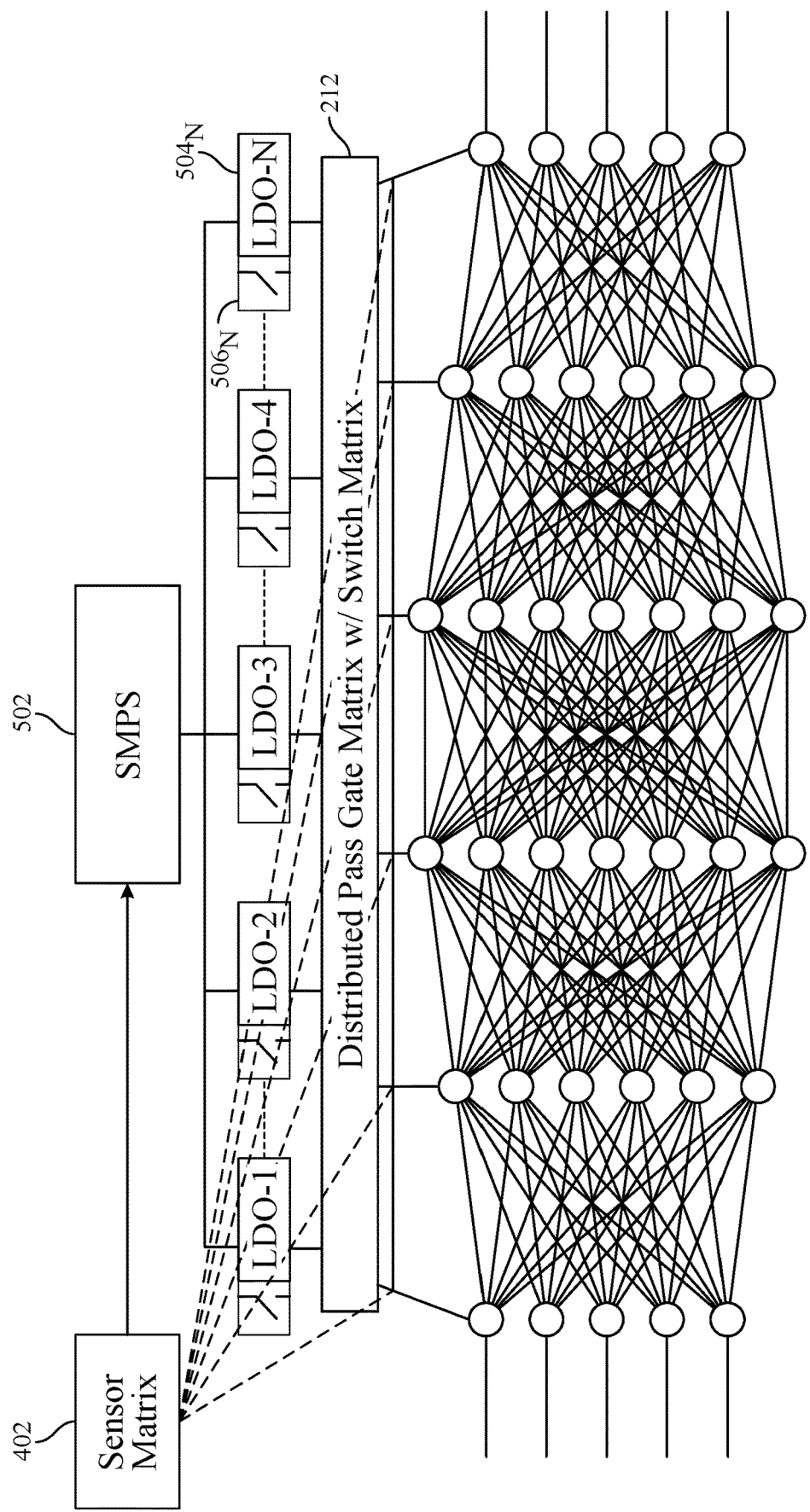

If a time interval is not preset (and therefore unknown) and voltage regulation at the output of the voltage regulator circuit is called for, then sensors may be used to monitor load conditions and provide feedback (e.g., to the primary voltage regulator circuit 502 and/or for controlling the bypass switches 506). For example, FIG. 5C illustrates the sensor matrix 402 coupled to the outputs of the distribution circuit 212 (as explained above). The sensor matrix 402 may be configured to provide feedback to the primary voltage regulator circuit 502. For certain aspects, the bypass switches 506 may be controlled based on the feedback provided by the sensor matrix 402.

Figure 5D:
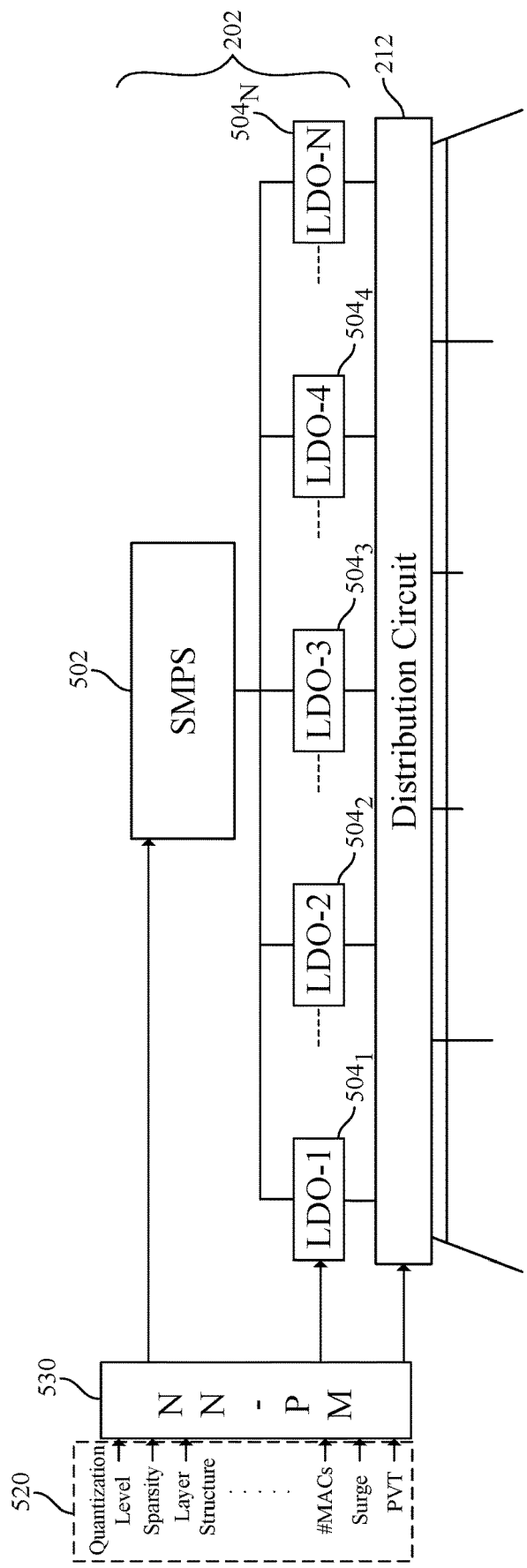
FIGS. 5D and 5E illustrate example implementations of a power management controller for the power supply circuit, using neural network circuits, in accordance with certain aspects of the present disclosure.

As described above, the power management controller (e.g., controller 250 of FIG. 2) may be designed to control the voltage regulator circuit 202 (e.g., the primary voltage regulator circuit 502 and/or the secondary voltage regulator circuits 504) and/or the distribution circuit 212 (e.g., the distributed pass gate matrix). As illustrated in FIG. 5D, inputs 520 to the power management controller may include structures of segments (such as fully connected, convolutional, or recursive layers), number of processing elements or other components in segments (e.g., number of neurons in layers), quantization levels of weights or activations, and sparsity information of weights or activation units in the neural network circuit 322. Additionally, process, supply voltage, and temperature (PVT) of the integrated circuit(s) implementing the dynamic load may be provided to the controller 250.

Figure 6A:
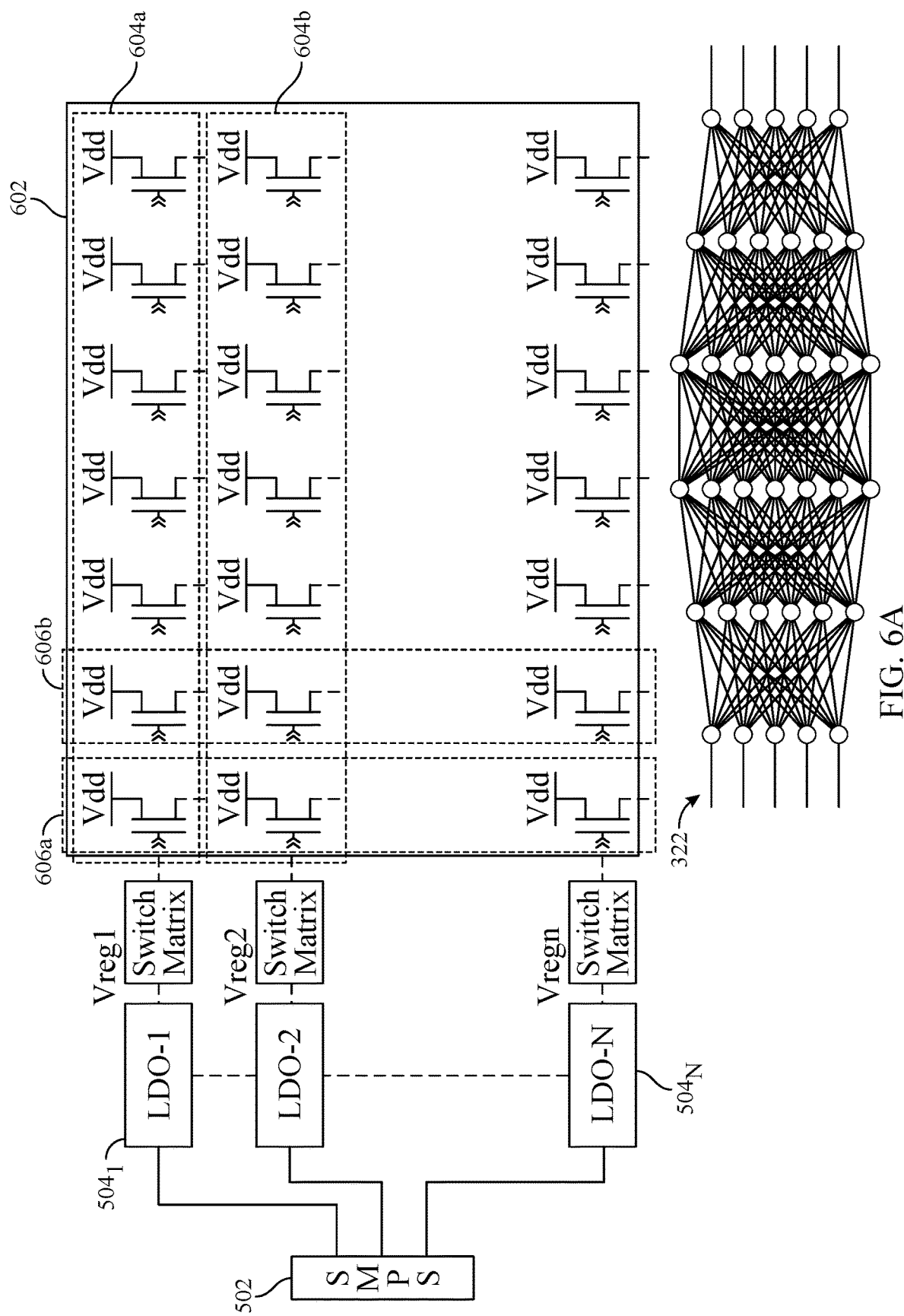
FIGS. 6A and 6B illustrate example distribution circuits for the stacked power supply scheme of FIGS. 5A-5C, implemented using one or more matrix structures, in accordance with certain aspects of the present disclosure.
Figure 6B:
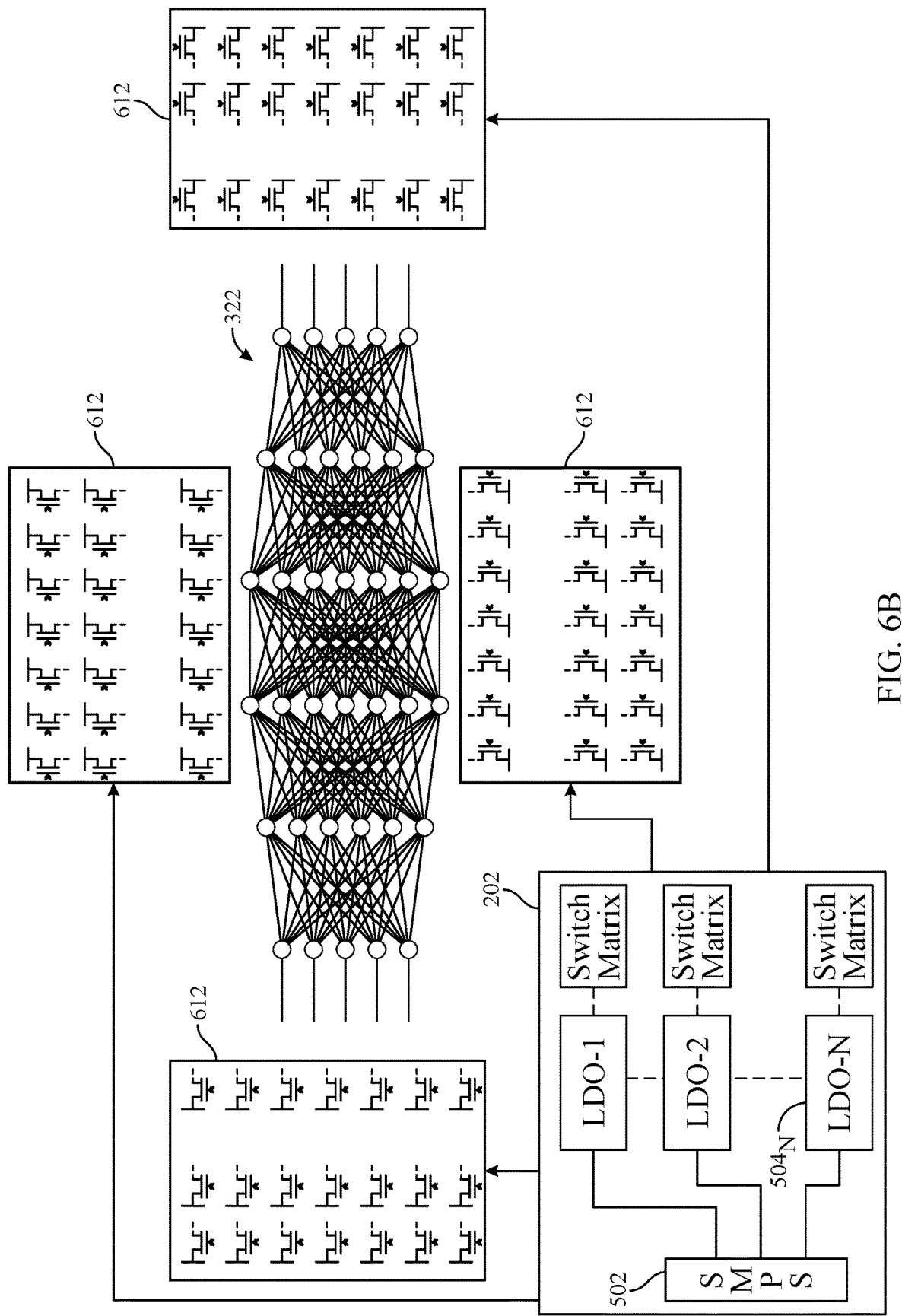

For certain aspects, the pass gate transistors may be distributed to mimic the distribution of physical circuits (e.g., memory cells, processing elements, MAC modules, logic circuit, etc.) in the neural network circuit 322. For example, the pass gate transistors may be distributed in a matrix with a row-and-column format adjacent to the neural network circuit 322. That is, the pass gate transistors may be arranged in a matrix with a plurality of rows 604a, 604b, etc. (collectively referred to as "rows 604"), and a plurality of columns 606a, 606b, etc. (collectively referred to as "columns 606"), as shown. The row-and-column format may be implemented as a single array 602 (as illustrated in FIG. 6A) or multiple arrays 612 (as illustrated in FIG. 6B). The outputs of any of the secondary voltage regulator circuits 504 may be selected (via a switch matrix and the array(s)) and used as an input to any of the pass gate transistors and their associated segments of the neural network circuit 322.

The power management controller may be an active optimized controller based on deep neural network (DNN) parameters and structure (e.g., implemented by the neural network circuit 322). Such parameters and structures include weighted transistor sizes based on the segment (e.g., based on the number of neurons within the layer). The weighted transistor sizes may be based on the number of neurons in the associated layer, or may be binary encoded.

Sparsity management may be implemented by scaling the output current based on compute-in-memory (CiM)=0. There are two conditions where the result is $\varphi_{weight}=0$ and $X_{in}=0$. Hence, the regulator output can be controlled and scaled based on total number of weights and inputs which are not equal to 0. This may be represented by the expression:

$$\Sigma(\sim\varphi_{weight})+\Sigma(\sim X_{in})$$

Power management control may be based on the type of layers within the neural network (e.g., fully connected layer (FCL), combination network layer (CNL), convolutional, or recursive). Neural network layers may be established and processed in a variety of ways. The number of neurons in a given layer may be based on a configuration of the layer.

For certain aspects, power management control may be based on the number of multiply-and-accumulate (MAC) units in the neural network circuit, on considerations of parallel computing (e.g., considering resource allocation), and/or on adaptive voltage scaling.

The power management controller may try to accumulate or combine at least a portion of the information described above to estimate the load and its activity. The prediction for this mode may be based on the activated number of neurons and the active number of transistors. For example, if sparsity is around 50% (e.g., approximately half of the neurons are inactive), then accordingly 50% of the current may be cut from the delivery. Thus, information from the layers, the MAC units, and/or sparsity management devices may be accumulated and used to approximately calculate the number of transistors active on the load side.

Figure 5E:
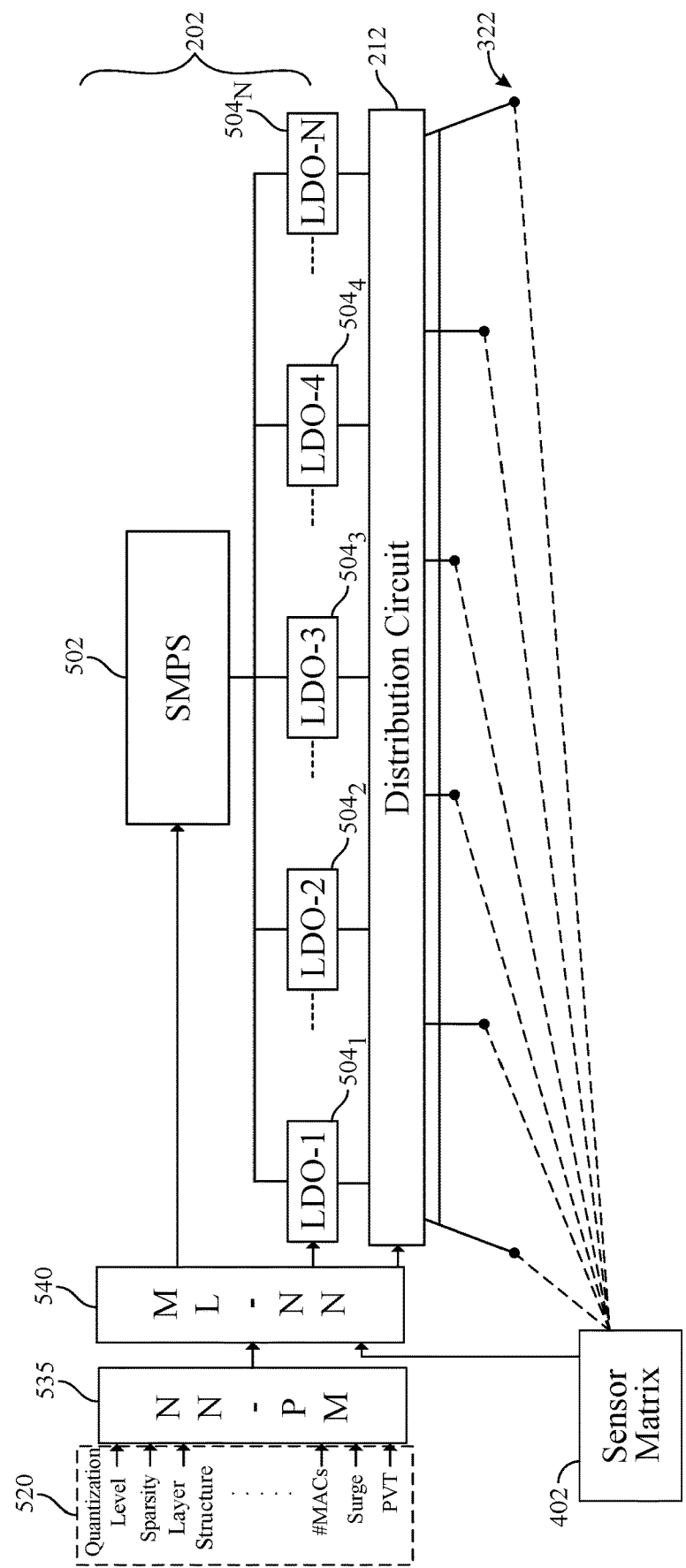

For certain aspects, the power management controller may itself be implemented as a neural network circuit (e.g., for implementing a deep neural network), as shown by a neural network 530 for power management (NN-PM) in FIG. 5D. In such cases, the power management controller may be directly used in inference learning or may use online learning/machine learning search-and-rescue (ML-SAR)-based control. For example, the controller neural network may be pre-trained regarding which pass gates and/or secondary voltage regulator circuits to enable, based on information obtained from activity in the dynamic load (e.g., the load neural network circuit). The controller neural network may also be retrained based on possible online training of the load neural network. For certain aspects, the controller may be implemented as a segmented neural network. For example, as shown in FIG. 5E, the controller may comprise a neural network for power management (NN-PM) portion 535 and a machine learning neural network (ML-NN) portion 540. In this case, the NN-PM portion 535 may be pre-trained, whereas the ML-NN portion 540 may be trained online. The NN-PM portion 535 of FIG. 5E may be similar to the neural network 530 of FIG. 5D.

For certain aspects in which at least a portion of the power management controller is implemented as a neural network, this neural network may enable the power management controller to predict future load scenarios (e.g., based on training with certain load activity and inference learning based on input data). For example, the power management controller with the neural network may monitor load activity during various scenarios and may predict future load demands for similar scenarios based on the monitored load activity and corresponding scenarios. The power management neural network may predict future load demands in real-time (e.g., while monitoring load activity), or may predict future load demands by analyzing load activity at a later time.

Aspects of the present disclosure provide for the controller neural network to generate the register settings for the pass gates and/or secondary voltage regulator circuits. Information related to the load neural network circuit may be input into the power management controller, and the power management controller may then determine, based on this information, which secondary voltage regulator circuit(s) and/or pass gate(s) to enable to manage an upcoming load.

For certain aspects, load sensors may be integrated into online neural network training, for example, to assist with overcoming circuit non-idealities and/or unpredicted load conditions. Load sensors may provide online or real-time information to the power management controller to allow for greater control and precision when dynamically managing power and load changes (e.g., in neural network circuits). For example, a load sensor may monitor a transition of a dynamic load (e.g., the load neural network circuit) from a light load to a high load and provide information online or in real time to the power management controller. In this example, the load sensor may detect a large current demand that may be more than a main pass gate (e.g., main pass gate 302) may deliver or may be more than expected. As a result, the power management controller may take one or more actions in response to the information provided by the load sensor(s). The one or more actions may include, for example, enabling one or more helper pass gates (e.g., auxiliary pass gates 304) to supply more current to meet the large current demand. For example, from the slope of current measurements (taken by the load sensor(s)), the power management controller may be able to predict (e.g., using its internal neural network) a subsequent larger current value (e.g., above a particular threshold) and enable one or more helper pass gates.

There may be an additional management layer between the power management controller and the primary voltage regulator circuit, secondary voltage regulator circuits, and pass gate matrix. For example, the management layer may have two inputs: the output of the power management controller and the output of a sensor matrix. As discussed above, the sensor matrix may collect different information based on load activity for the load neural network circuit. This enables the management layer to dynamically learn which secondary voltage regulator circuits and/or pass gates are more frequently used, which may allow the management layer to more accurately determine which secondary voltage regulator circuits and/or pass gates to enable for future loads.

Example Operations for Supplying Power

Figure 7:
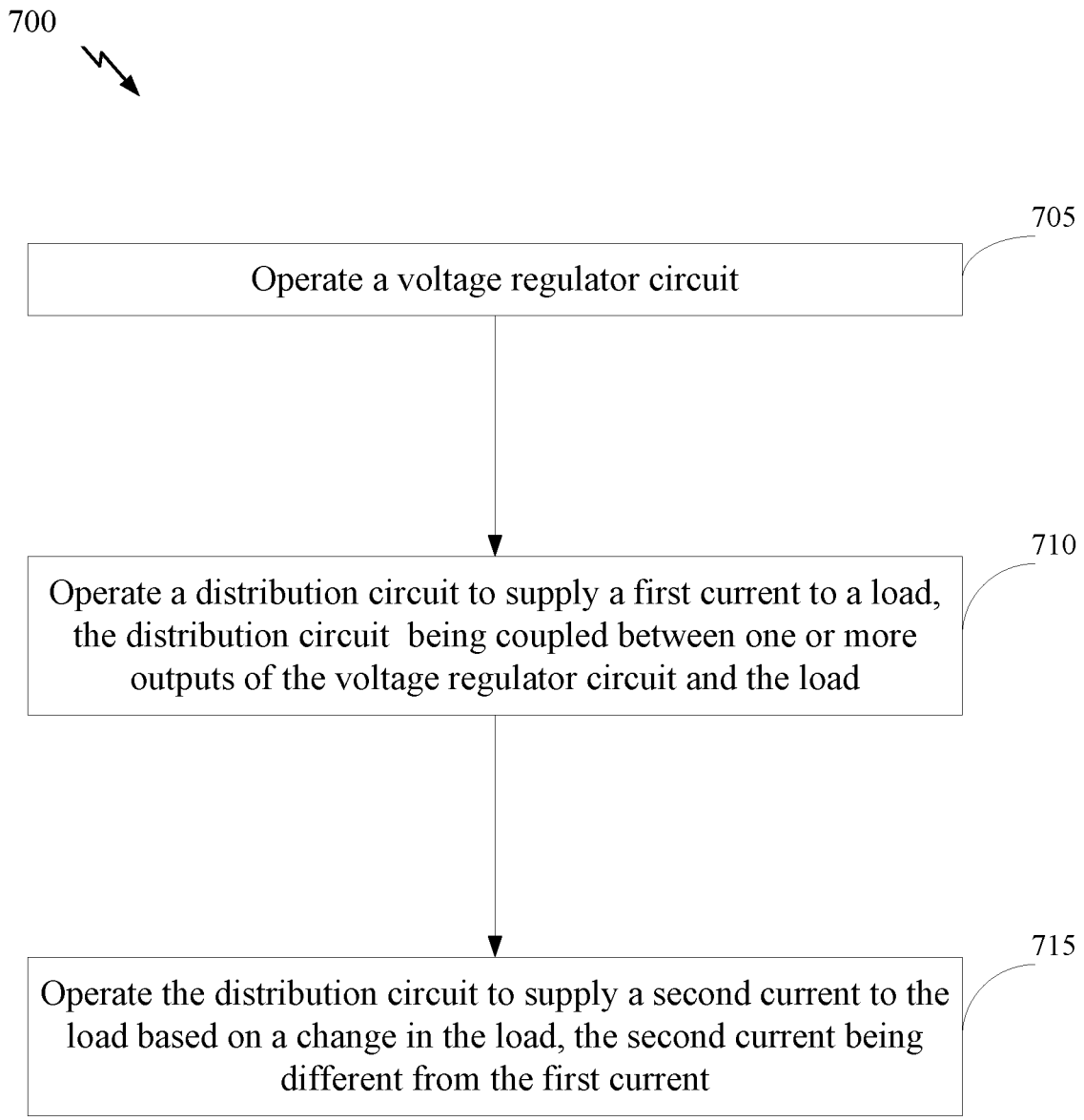
FIG. 7 is a flow diagram illustrating example operations for supplying power, in accordance with certain aspects of the present disclosure.

FIG. 7 is a flow diagram illustrating example operations 700 for supplying power to a dynamic load, in accordance with certain aspects of the present disclosure. The operations 700 may be performed by a power supply circuit, such as the power supply circuit 200 described with respect to FIG. 2.

The operations 700 may begin at block 705 with the power supply circuit operating a voltage regulator circuit (e.g., the voltage regulator circuit 202). At block 710, the power supply circuit may operate a distribution circuit (e.g., the distribution circuit 212) to supply a first current to a load (e.g., the dynamic load 222). The distribution circuit may be coupled between one or more outputs of the voltage regulator circuit and the load. Based on a change in the load, the distribution circuit may be operated at block 715 to supply a second current to the load, where the second current is different from the first current.

According to certain aspects, the load includes a neural network circuit (e.g., the neural network circuit 322) having a plurality of segments (e.g., represented by layers 324, 326, 328, 330, 332, 334). In this case, the change in the load may involve activation of a different segment in the plurality of segments of the neural network circuit. For certain aspects, operating the distribution circuit to supply the first current at block 710 may include supplying the first current to a first segment (e.g., represented by layer 330) of the neural network circuit, and operating the distribution circuit to supply the second current at block 715 may involve supplying the second current to a second segment (e.g., represented by layer 332) of the neural network circuit, based on activating the second segment. In this case, the second segment of the neural network circuit may have a lower number of components than the first segment of the neural network circuit, the change in the load may include inactivating the first segment and activating the second segment, and the second current may be lower than the first current. For certain aspects, the distribution circuit includes a plurality of pass gate transistors (e.g., transistors M1-M6); operating the distribution circuit to supply the first current at block 710 involves turning on a first transistor (e.g., transistor M4) in the plurality of pass gate transistors to supply the first current to the first segment of the neural network circuit; operating the distribution circuit to supply the second current at block 715 involves turning off the first transistor and turning on a second transistor (e.g., transistor M5) in the plurality of pass gate transistors to supply the second current to the second segment of the neural network circuit; and the second transistor is smaller than the first transistor. For certain aspects, the distribution circuit comprises a plurality of switches (e.g., analog switches, such as pass gates 302, 304); operating the distribution circuit to supply the first current at block 710 involves closing a first switch in the plurality of switches to supply the first current to the first segment of the neural network circuit; and operating the distribution circuit to supply the second current at block 715 involves opening the first switch and closing a second switch in the plurality of switches to supply the second current to the second segment of the neural network circuit. For certain aspects, operating the distribution circuit to supply the first current at block 710 further involves closing a third switch in the plurality of switches during an interval of increased current demand. In this case, the first switch may be designated as a main switch (e.g., a main pass gate 302) for the first segment of the neural network circuit, and the third switch may be designated as an auxiliary switch (e.g., an auxiliary pass gate 304) for the first segment of the neural network circuit.

According to certain aspects, the voltage regulator circuit includes a primary voltage regulator circuit (e.g., the primary voltage regulator circuit 502) and a plurality of secondary voltage regulator circuits (e.g., secondary voltage regulator circuits 504), where the plurality of secondary voltage regulator circuits has inputs coupled to an output of the primary voltage regulator circuit and has outputs coupled to one or more outputs of the voltage regulator circuit. In this case, the plurality of secondary voltage regulator circuits may be configured to output two or more different output voltages, and the operations 700 may further involve selecting one of the secondary voltage regulator circuits for supplying power to the load. For certain aspects, the distribution circuit includes a switch matrix (e.g., switch matrix 314 or array 602, 612) comprising multiple rows of pass gate transistors, where each row of the switch matrix may be coupled to a different output of the plurality of secondary voltage regulator circuits and/or where each column of the switch matrix may be coupled to the one or more outputs of the voltage regulator circuit. In this case, operating the distribution circuit to supply the first current at block 710 may involve turning on a first transistor at a first row (e.g., the row 604a) and at a first column (e.g., the column 606a) in the switch matrix to supply the first current to the load, and operating the distribution circuit to supply the second current at block 715 may involve turning off the first transistor and turning on a second transistor at a second row (e.g., the row 604b) and at a second column (e.g., the column 606b) in the switch matrix to supply the second current based on the change in the load. For certain aspects, the operations 700 may further involve selectively bypassing at least one of the secondary voltage regulator circuits (e.g., with bypass switch(es) 506).

According to certain aspects, the operations 700 further involve sensing output voltages at outputs of the voltage regulator circuit. In this case, the operations 700 may also further involve receiving, at a controller (e.g., controller 250), indications of the output voltages at the outputs of the voltage regulator circuit and controlling operation of the distribution circuit based, at least in part, on the indications of the output voltages at the outputs of the voltage regulator circuit.

According to certain aspects, the operations 700 further involve controlling operation of the distribution circuit with a controller (e.g., controller 250). In this case, the operations 700 may further include training the controller based on changes to the load, wherein the controlling comprises controlling the operation of the distribution circuit with the controller using inference learning. For certain aspects, the load comprises a neural network circuit (e.g., neural network circuit 322) having a plurality of segments. In this case, the controlling may include controlling the operation of the distribution circuit with the controller based on one or more characteristics of the neural network circuit. For example, the one or more characteristics of the neural network circuit may include at least one of a structure of the plurality of segments, a number of components in each segment of the plurality of segments, quantization levels of weights, quantization levels of activations, sparsity information of weights, or sparsity information of activation units. For certain aspects, the operations 700 further involve controlling operation of the voltage regulator circuit with the controller.

Example Device with Power Management for a Dynamic Load

Figure 8:
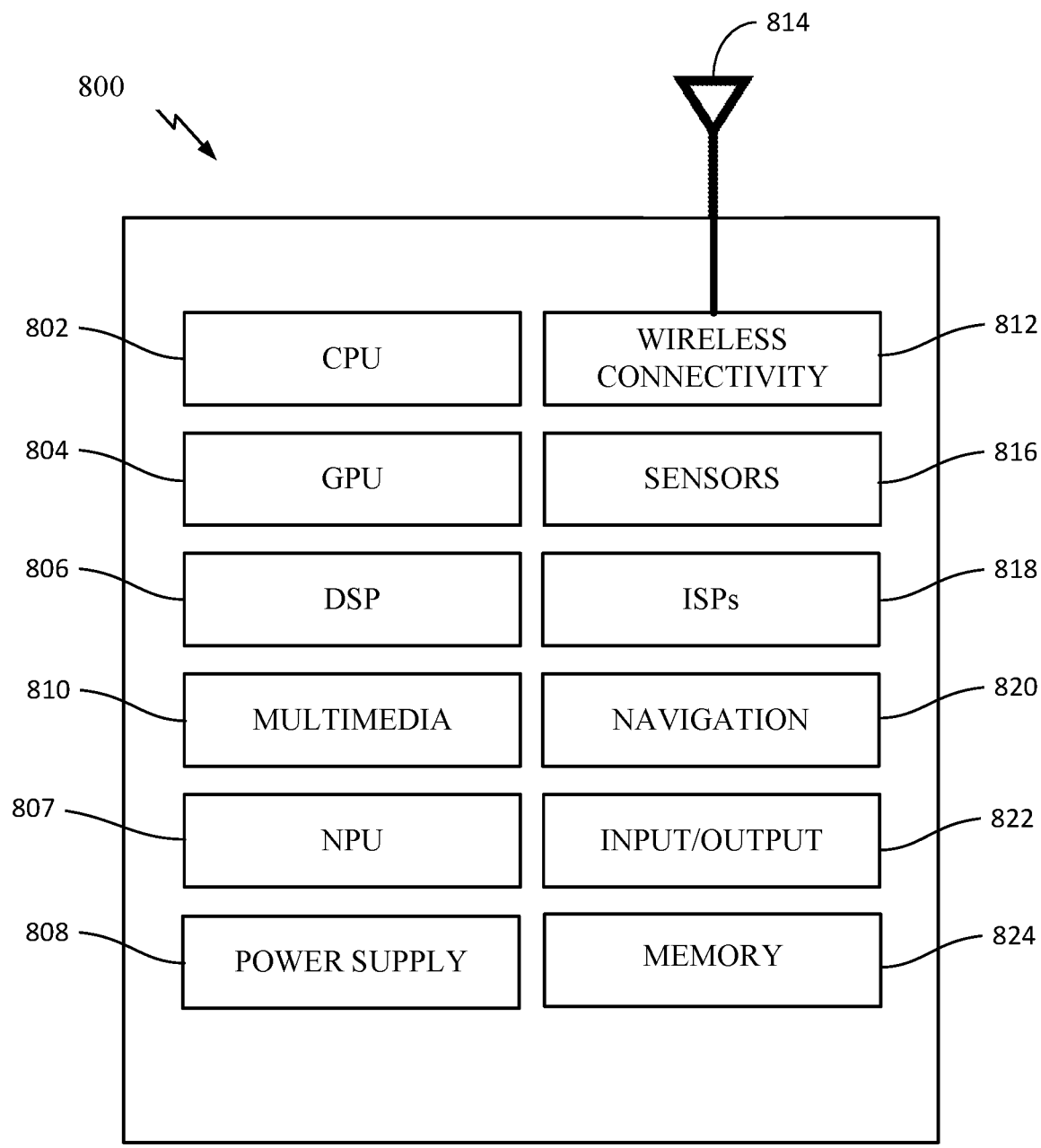
FIG. 8 is a block diagram illustrating an example electronic device having a dynamic load, in accordance with certain aspects of the present disclosure.

FIG. 8 illustrates an example electronic device 800. The electronic device 800 may be configured to perform the methods described herein, including the operations 700 described with respect to FIG. 7.

The electronic device 800 includes a central processing unit (CPU) 802, which in some aspects may be a multi-core CPU. Instructions executed at the CPU 802 may be loaded, for example, from a program memory associated with the CPU 802 or may be loaded from a memory 824.

The electronic device 800 also includes additional processing blocks tailored to specific functions, such as a graphics processing unit (GPU) 804, a digital signal processor (DSP) 806, a neural processing unit (NPU) 807 (e.g., for implementing a neural network) or other dynamic load, a multimedia processing block 810, and a wireless connectivity processing block 812. In some implementations, the NPU 807 is implemented in one or more of the CPU 802, GPU 804, and/or DSP 806.

In some aspects, the wireless connectivity processing block 812 may include components, for example, for Third-Generation (3G) connectivity, Fourth-Generation (4G) connectivity (e.g., 4G LTE), Fifth-Generation connectivity (e.g., 5G or NR), Wi-Fi connectivity, Bluetooth connectivity, and/or wireless data transmission standards. The wireless connectivity processing block 812 is further connected to one or more antennas 814 to facilitate wireless communication.

The electronic device 800 may also include one or more sensor processors 816 associated with any manner of one or more sensors, one or more image signal processors (ISPs) 818 associated with any manner of one or more image sensors, and/or a navigation processor 820, which may include satellite-based positioning system components (e.g., Global Positioning System (GPS)), as well as inertial positioning system components.

The electronic device 800 may also include one or more input and/or output devices 822, such as screens, touch-sensitive surfaces (including touch-sensitive displays), physical buttons, speakers, microphones, and the like. In some aspects, one or more of the processors of the electronic device 800 may be based on an Advanced RISC Machines (ARM) instruction set, where RISC stands for "reduced instruction set computing."

The electronic device 800 also includes a power supply 808 (e.g., the power supply circuit 200 described with respect to FIG. 2), which may include one or more batteries and a power management circuit.

The electronic device 800 also includes memory 824, which is representative of one or more static and/or dynamic memories, such as a dynamic random access memory (DRAM), a flash-based static memory, and the like. In this example, memory 824 includes computer-executable components, which may be executed by one or more of the aforementioned processors of the electronic device 800, including the NPU 807. The depicted components, and others not depicted, may be configured to perform various aspects of the methods described herein.

In some aspects, such as where the electronic device 800 is a server device, various aspects may be omitted from the example depicted in FIG. 8, such as one or more of the multimedia processing block 810, wireless connectivity processing block 812, antenna(s) 814, sensor processors 816, ISPs 818, and/or navigation processor 820.

Example Clauses

In addition to the various aspects described above, specific combinations of aspects are within the scope of the disclosure, some of which are detailed in the clauses below:

Clause 1: A power supply circuit for supplying power to a dynamic load, the power supply circuit comprising: a voltage regulator circuit; and a distribution circuit coupled to one or more outputs of the voltage regulator circuit and configured to output different amounts of current based on changes in the dynamic load.

Clause 2: The power supply circuit of Clause 1, wherein the dynamic load comprises a neural network circuit having a plurality of segments.

Clause 3: The power supply circuit of Clause 2, wherein the distribution circuit is configured to output the different amounts of current based on which segment in the plurality of segments of the neural network circuit is active.

Clause 4: The power supply circuit of Clause 2 or 3, wherein a first output of the distribution circuit is coupled to a first segment of the neural network circuit and wherein a second output of the distribution circuit is coupled to a second segment of the neural network circuit.

Clause 5: The power supply circuit of Clause 4, wherein the first segment of the neural network circuit has a greater number of components than the second segment of the neural network circuit and wherein the distribution circuit is configured to deliver a higher current when the first segment is active compared to when the second segment is active.

Clause 6: The power supply circuit of Clause 5, wherein the distribution circuit comprises a plurality of pass gate transistors, wherein a first transistor in the plurality of pass gate transistors is configured to be turned on when the first segment of the neural network circuit is active, wherein a second transistor in the plurality of pass gate transistors is configured to be turned on when the second segment of the neural network circuit is active, and wherein the second transistor is smaller than the first transistor.

Clause 7: The power supply circuit of any of Clauses 4-6, wherein the distribution circuit comprises a plurality of switches coupled to the one or more outputs of the voltage regulator circuit, wherein a first switch in the plurality of switches is configured to be turned on when the first segment of the neural network circuit is active, and wherein a second switch in the plurality of switches is configured to be turned on when the second segment of the neural network circuit is active.

Clause 8: The power supply circuit of Clause 7, wherein a third switch in the plurality of switches is configured to be turned on when the first segment of the neural network circuit is active and during an interval of increased current demand, wherein the first switch is designated as a main switch for the first segment of the neural network circuit, and wherein the third switch is designated as an auxiliary switch for the first segment of the neural network circuit.

Clause 9: The power supply circuit of any of the preceding Clauses, wherein the distribution circuit comprises a switch matrix.

Clause 10: The power supply circuit of Clause 9, wherein the switch matrix comprises a row of pass gate transistors coupled to the one or more outputs of the voltage regulator circuit and wherein the row of pass gate transistors comprises a plurality of transistors capable of delivering at least two different amounts of current.

Clause 11: The power supply circuit of any of the preceding Clauses, wherein the voltage regulator circuit comprises a switched-mode power supply circuit.

Clause 12: The power supply circuit of any of the preceding Clauses, wherein the voltage regulator circuit comprises a primary voltage regulator circuit and a plurality of secondary voltage regulator circuits, the plurality of secondary voltage regulator circuits having inputs coupled to an output of the primary voltage regulator circuit and having outputs coupled to the one or more outputs of the voltage regulator circuit.

Clause 13: The power supply circuit of Clause 12, wherein the primary voltage regulator circuit comprises a switched-mode power supply circuit and wherein the plurality of secondary voltage regulator circuits comprises a plurality of low-dropout (LDO) regulator circuits.

Clause 14: The power supply circuit of Clause 13, wherein the plurality of LDO regulator circuits is configured to output two or more different output voltages.

Clause 15: The power supply circuit of any of Clauses 12-14, wherein the distribution circuit comprises a switch matrix comprising multiple rows of pass gate transistors, wherein each row of the switch matrix is coupled to a different output of the plurality of secondary voltage regulator circuits, and wherein each column of the switch matrix is coupled to the one or more outputs of the voltage regulator circuit.

Clause 16: The power supply circuit of any of Clauses 12-15, wherein the voltage regulator circuit further comprises at least one bypass circuit coupled in parallel with at least one of the secondary voltage regulator circuits and configured to directly couple the output of the primary voltage regulator circuit to at least one of the outputs of the voltage regulator circuit.

Clause 17: The power supply circuit of any of the preceding Clauses, wherein the voltage regulator circuit comprises a feedback loop with a replica load circuit.

Clause 18: The power supply circuit of any of the preceding Clauses, further comprising a sensor matrix having a plurality of sensors coupled to the outputs of the voltage regulator circuit and configured to sense output voltages at the outputs of the voltage regulator circuit.

Clause 19: The power supply circuit of Clause 18, wherein the sensor matrix is coupled in a feedback loop to the distribution circuit.

Clause 20: The power supply circuit of Clause 18 or 19, further comprising a controller having a plurality of inputs coupled to the sensor matrix and having one or more outputs coupled to one or more control inputs of the distribution circuit, the controller being configured to control operation of the distribution circuit based, at least in part, on indications of the output voltages at the outputs of the voltage regulator circuit sensed by the plurality of sensors.

Clause 21: The power supply circuit of any of the preceding Clauses, further comprising a controller having one or more outputs coupled to one or more control inputs of the distribution circuit and configured to control operation of the distribution circuit.

Clause 22: The power supply circuit of Clause 21, wherein the controller is configured to receive at least one indication of a process, a voltage, or a temperature associated with the power supply circuit.

Clause 23: The power supply circuit of Clause 21 or 22, wherein the controller comprises a neural network circuit and wherein the controller is further configured to be trained for the dynamic load and to control the operation of at least one of the distribution circuit or the voltage regulator circuit, based on inference learning.

Clause 24: The power supply circuit of any of Clauses 21-23, wherein the dynamic load comprises a neural network circuit having a plurality of segments and wherein the controller is configured to control the operation of the distribution circuit based on one or more characteristics of the neural network circuit.

Clause 25: The power supply circuit of Clause 24, wherein the one or more characteristics of the neural network circuit comprise at least one of a structure of the plurality of segments, a number of components in each segment of the plurality of segments, quantization levels of weights, quantization levels of activations, sparsity information of weights, or sparsity information of activation units.

Clause 26: The power supply circuit of any of Clauses 21-25, wherein the controller has one or more other outputs coupled to one or more control inputs of the voltage regulator circuit and is further configured to control operation of the voltage regulator circuit.

Clause 27: A method of supplying power, the method comprising: operating a voltage regulator circuit; operating a distribution circuit to supply a first current to a load, the distribution circuit being coupled between one or more outputs of the voltage regulator circuit and the load; and based on a change in the load, operating the distribution circuit to supply a second current to the load, the second current being different from the first current.

Clause 28: The method of Clause 27, wherein the load comprises a neural network circuit having a plurality of segments.

Clause 29: The method of Clause 28, wherein the change in the load comprises activation of a different segment in the plurality of segments of the neural network circuit.

Clause 30: The method of Clause 28 or 29, wherein: operating the distribution circuit to supply the first current comprises supplying the first current to a first segment of the neural network circuit; and operating the distribution circuit to supply the second current comprises supplying the second current to a second segment of the neural network circuit, based on activating the second segment.

Clause 31: The method of Clause 30, wherein the second segment of the neural network circuit has a lower number of components than the first segment of the neural network circuit, wherein the change in the load comprises inactivating the first segment and activating the second segment, and wherein the second current is lower than the first current.

Clause 32: The method of Clause 31, wherein: the distribution circuit comprises a plurality of pass gate transistors; operating the distribution circuit to supply the first current comprises turning on a first transistor in the plurality of pass gate transistors to supply the first current to the first segment of the neural network circuit; operating the distribution circuit to supply the second current comprises turning off the first transistor and turning on a second transistor in the plurality of pass gate transistors to supply the second current to the second segment of the neural network circuit; and the second transistor is smaller than the first transistor.

Clause 33: The method of any of Clauses 30-32, wherein: the distribution circuit comprises a plurality of switches; operating the distribution circuit to supply the first current comprises closing a first switch in the plurality of switches to supply the first current to the first segment of the neural network circuit; and operating the distribution circuit to supply the second current comprises opening the first switch and closing a second switch in the plurality of switches to supply the second current to the second segment of the neural network circuit.

Clause 34: The method of Clause 33, wherein: operating the distribution circuit to supply the first current further comprises closing a third switch in the plurality of switches during an interval of increased current demand; the first switch is designated as a main switch for the first segment of the neural network circuit; and the third switch is designated as an auxiliary switch for the first segment of the neural network circuit.

Clause 35: The method of any of Clauses 27-34, wherein: the voltage regulator circuit comprises a primary voltage regulator circuit and a plurality of secondary voltage regulator circuits, the plurality of secondary voltage regulator circuits having inputs coupled to an output of the primary voltage regulator circuit and having outputs coupled to one or more outputs of the voltage regulator circuit; the plurality of secondary voltage regulator circuits is configured to output two or more different output voltages; and the method further comprises selecting one of the secondary voltage regulator circuits for supplying power to the load.

Clause 36: The method of Clause 35, wherein: the distribution circuit comprises a switch matrix comprising multiple rows of pass gate transistors; each row of the switch matrix is coupled to a different output of the plurality of secondary voltage regulator circuits; each column of the switch matrix is coupled to the one or more outputs of the voltage regulator circuit; operating the distribution circuit to supply the first current comprises turning on a first transistor at a first row and at a first column in the switch matrix to supply the first current to the load; and operating the distribution circuit to supply the second current comprises turning off the first transistor and turning on a second transistor at a second row and at a second column in the switch matrix to supply the second current based on the change in the load.

Clause 37: The method of Clause 35 or 36, further comprising selectively bypassing at least one of the secondary voltage regulator circuits.

Clause 38: The method of any of Clauses 27-37, further comprising sensing output voltages at outputs of the voltage regulator circuit.

Clause 39: The method of Clause 38, further comprising: receiving, at a controller, indications of the output voltages at the outputs of the voltage regulator circuit; and controlling operation of the distribution circuit based, at least in part, on the indications of the output voltages at the outputs of the voltage regulator circuit.

Clause 40: The method of any of Clauses 27-39, further comprising controlling operation of the distribution circuit with a controller.

Clause 41: The method of Clause 40, further comprising training the controller based on changes to the load, wherein the controlling comprises controlling the operation of the distribution circuit with the controller using inference learning.

Clause 42: The method of Clause 40 or 41, wherein the load comprises a neural network circuit having a plurality of segments and wherein the controlling comprises controlling the operation of the distribution circuit with the controller based on one or more characteristics of the neural network circuit.

Clause 43: The method of Clause 42, wherein the one or more characteristics of the neural network circuit comprise at least one of a structure of the plurality of segments, a number of components in each segment of the plurality of segments, quantization levels of weights, quantization levels of activations, sparsity information of weights, or sparsity information of activation units.

Clause 44: The method of any of Clauses 40-43, further comprising controlling operation of the voltage regulator circuit with the controller.

Clause 45: Each method, apparatus, system, non-transitory computer-readable medium, and combinations thereof as illustrated, shown, implied, and described herein and in the accompanying documents.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A power supply circuit for supplying power to a dynamic load, the power supply circuit comprising:
 a voltage regulator circuit; and
 a distribution circuit comprising a transistor matrix including multiple transistor rows and multiple transistor columns, at least one of the multiple transistor rows including a plurality of transistors and at least one of the multiple transistor columns including a plurality of transistors, wherein the distribution circuit is coupled to one or more outputs of the voltage regulator circuit and configured to output different amounts of current to the dynamic load via the plurality of transistors of the at least one of the multiple transistor rows and via the plurality of transistors of the at least one of the multiple transistor columns, based on changes in the dynamic load.

2. The power supply circuit of claim 1, wherein:
 the dynamic load comprises a neural network circuit having a plurality of segments; and
 the distribution circuit is configured to output the different amounts of current based on which segment in the plurality of segments of the neural network circuit is active.

3. The power supply circuit of claim 1, wherein:
 the dynamic load comprises a neural network circuit having a plurality of segments;
 a first output of the distribution circuit is coupled to a first segment of the neural network circuit; and
 a second output of the distribution circuit is coupled to a second segment of the neural network circuit.

4. The power supply circuit of claim 3, wherein the first segment of the neural network circuit has a greater number of components than the second segment of the neural network circuit and wherein the distribution circuit is configured to deliver a higher current when the first segment is active compared to when the second segment is active.

5. The power supply circuit of claim 4, wherein the plurality of transistors comprises a plurality of pass gate transistors, wherein a first transistor in the plurality of pass gate transistors is configured to be turned on when the first segment of the neural network circuit is active, wherein a second transistor in the plurality of pass gate transistors is configured to be turned on when the second segment of the neural network circuit is active, and wherein the second transistor is smaller than the first transistor.

6. The power supply circuit of claim 3, wherein the plurality of transistors comprises a plurality of switches coupled to the one or more outputs of the voltage regulator circuit, wherein a first switch in the plurality of switches is configured to be turned on when the first segment of the neural network circuit is active, and wherein a second switch in the plurality of switches is configured to be turned on when the second segment of the neural network circuit is active.

7. The power supply circuit of claim 6, wherein a third switch in the plurality of switches is configured to be turned on when the first segment of the neural network circuit is active and during an interval of increased current demand, wherein the first switch is designated as a main switch for the first segment of the neural network circuit, and wherein the third switch is designated as an auxiliary switch for the first segment of the neural network circuit.

8. The power supply circuit of claim 1, wherein:
the transistor matrix comprises a row of pass gate transistors coupled to the one or more outputs of the voltage regulator circuit; and
the row of pass gate transistors is capable of delivering at least two different amounts of current.

9. The power supply circuit of claim 1, wherein the voltage regulator circuit comprises a switched-mode power supply circuit.

10. The power supply circuit of claim 1, wherein the voltage regulator circuit comprises a primary voltage regulator circuit and a plurality of secondary voltage regulator circuits, the plurality of secondary voltage regulator circuits having inputs coupled to an output of the primary voltage regulator circuit and having outputs coupled to the one or more outputs of the voltage regulator circuit.

11. The power supply circuit of claim 10, wherein:
the primary voltage regulator circuit comprises a switched-mode power supply circuit;
the plurality of secondary voltage regulator circuits comprises a plurality of low-dropout (LDO) regulator circuits; and
the plurality of LDO regulator circuits is configured to output two or more different output voltages.

12. The power supply circuit of claim 10, wherein the transistor matrix comprises multiple rows of pass gate transistors, wherein each row of the transistor matrix is coupled to a different output of the plurality of secondary voltage regulator circuits, and wherein each column of the transistor matrix is coupled to the one or more outputs of the voltage regulator circuit.

13. The power supply circuit of claim 10, wherein the voltage regulator circuit further comprises at least one bypass circuit coupled in parallel with at least one of the secondary voltage regulator circuits and configured to directly couple the output of the primary voltage regulator circuit to at least one of the outputs of the voltage regulator circuit.

14. The power supply circuit of claim 1, wherein the voltage regulator circuit comprises a feedback loop with a replica load circuit.

15. The power supply circuit of claim 1, further comprising a sensor matrix having a plurality of sensors coupled to the outputs of the voltage regulator circuit and configured to sense output voltages at the outputs of the voltage regulator circuit, wherein the sensor matrix is coupled in a feedback loop to the distribution circuit.

16. The power supply circuit of claim 15, further comprising a controller having a plurality of inputs coupled to the sensor matrix and having one or more outputs coupled to one or more control inputs of the distribution circuit, the controller being configured to control operation of the distribution circuit based, at least in part, on indications of the output voltages at the outputs of the voltage regulator circuit sensed by the plurality of sensors.

17. The power supply circuit of claim 1, further comprising a controller having one or more outputs coupled to one or more control inputs of the distribution circuit and configured to control operation of the distribution circuit, wherein the controller is configured to receive at least one indication of a process, a voltage, or a temperature associated with the power supply circuit.

18. The power supply circuit of claim 1, further comprising a controller having one or more outputs coupled to one or more control inputs of the distribution circuit and configured to control operation of the distribution circuit, wherein the controller comprises a neural network circuit and wherein the controller is further configured to be trained for the dynamic load and to control the operation of at least one of the distribution circuit or the voltage regulator circuit, based on inference learning.

19. The power supply circuit of claim 1, further comprising a controller having one or more outputs coupled to one or more control inputs of the distribution circuit and configured to control operation of the distribution circuit, wherein the dynamic load comprises a neural network circuit having a plurality of segments and wherein the controller is configured to control the operation of the distribution circuit based on one or more characteristics of the neural network circuit.

20. The power supply circuit of claim 19, wherein the one or more characteristics of the neural network circuit comprise at least one of a structure of the plurality of segments, a number of components in each segment of the plurality of segments, quantization levels of weights, quantization levels of activations, sparsity information of weights, or sparsity information of activation units.

21. The power supply circuit of claim 1, further comprising a controller having one or more outputs coupled to one or more control inputs of the distribution circuit and configured to control operation of the distribution circuit, wherein the controller has one or more other outputs coupled to one or more control inputs of the voltage regulator circuit and is further configured to control operation of the voltage regulator circuit.

22. A method of supplying power, the method comprising:
operating a voltage regulator circuit;
operating a distribution circuit to supply a first current to a load, the distribution circuit being coupled between one or more outputs of the voltage regulator circuit and the load, the distribution circuit comprising a transistor matrix including multiple transistor rows and multiple transistor columns, at least one of the multiple transistor rows including a plurality of transistors and at least one of the multiple transistor columns including a plurality of transistors, the first current being provided via a transistor of the one of the multiple transistor columns and a transistor of the one of the multiple transistor rows;
based on a change in the load, operating the distribution circuit to supply a second current to the load via another transistor of the one of the multiple transistor rows, the second current being different from the first current; and
based on a change in the load, operating the distribution circuit to supply a third current to the load via another transistor of the one of the multiple transistor columns, the third current being different from the first current.

23. The method of claim 22, wherein:
the load comprises a neural network circuit having a plurality of segments; and
the change in the load comprises activation of a different segment in the plurality of segments of the neural network circuit.

24. The method of claim 22, wherein:
the load comprises a neural network circuit having a plurality of segments;
operating the distribution circuit to supply the first current comprises supplying the first current to a first segment of the neural network circuit; and
operating the distribution circuit to supply the second current comprises supplying the second current to a second segment of the neural network circuit, based on activating the second segment.

25. The method of claim 24, wherein:
the second segment of the neural network circuit has a lower number of components than the first segment of the neural network circuit;
the change in the load comprises inactivating the first segment and activating the second segment;
the second current is lower than the first current;
the plurality of transistors comprises a plurality of pass gate transistors;
operating the distribution circuit to supply the first current comprises turning on a first transistor in the plurality of pass gate transistors to supply the first current to the first segment of the neural network circuit;
operating the distribution circuit to supply the second current comprises turning off the first transistor and turning on a second transistor in the plurality of pass gate transistors to supply the second current to the second segment of the neural network circuit; and
the second transistor is smaller than the first transistor.

26. The method of claim 24, wherein:
the plurality of transistors include a plurality of switches;
operating the distribution circuit to supply the first current comprises closing a first switch in the plurality of switches to supply the first current to the first segment of the neural network circuit;
operating the distribution circuit to supply the second current comprises opening the first switch and closing a second switch in the plurality of switches to supply the second current to the second segment of the neural network circuit;
operating the distribution circuit to supply the first current further comprises closing a third switch in the plurality of switches during an interval of increased current demand;
the first switch is designated as a main switch for the first segment of the neural network circuit; and
the third switch is designated as an auxiliary switch for the first segment of the neural network circuit.

27. The method of claim 22, wherein:
the voltage regulator circuit comprises a primary voltage regulator circuit and a plurality of secondary voltage regulator circuits, the plurality of secondary voltage regulator circuits having inputs coupled to an output of the primary voltage regulator circuit and having outputs coupled to one or more outputs of the voltage regulator circuit;
the plurality of secondary voltage regulator circuits is configured to output two or more different output voltages; and
the method further comprises:
selecting one of the secondary voltage regulator circuits for supplying power to the load; and
selectively bypassing at least one of the secondary voltage regulator circuits.

28. The method of claim 27, wherein:
the multiple transistor rows include multiple rows of pass gate transistors;
each row of the transistor matrix is coupled to a different output of the plurality of secondary voltage regulator circuits;
each column of the transistor matrix is coupled to the one or more outputs of the voltage regulator circuit;
operating the distribution circuit to supply the first current comprises turning on a first transistor at a first row and at a first column in the transistor matrix to supply the first current to the load; and
operating the distribution circuit to supply the second current comprises turning off the first transistor and turning on a second transistor at a second row and at a second column in the transistor matrix to supply the second current based on the change in the load.

29. The method of claim 27, further comprising:
controlling operation of the distribution circuit with a controller;
training the controller based on changes to the load, wherein the controlling comprises controlling the operation of the distribution circuit with the controller using inference learning; and
controlling operation of the voltage regulator circuit with the controller, wherein:
the load comprises a neural network circuit having a plurality of segments;
the controlling the operation of the distribution circuit comprises controlling the operation of the distribution circuit with the controller based on one or more characteristics of the neural network circuit; and
the one or more characteristics of the neural network circuit comprise at least one of a structure of the plurality of segments, a number of components in each segment of the plurality of segments, quantization levels of weights, quantization levels of activations, sparsity information of weights, or sparsity information of activation units.

30. The method of claim 22, further comprising:
sensing output voltages at outputs of the voltage regulator circuit;
receiving, at a controller, indications of the output voltages at the outputs of the voltage regulator circuit; and
controlling operation of the distribution circuit based, at least in part, on the indications of the output voltages at the outputs of the voltage regulator circuit.

* * * * *